(12) United States Patent
Basit et al.

(10) Patent No.: US 11,780,760 B2
(45) Date of Patent: Oct. 10, 2023

(54) SYSTEMS AND METHODS FOR PROCESSING A GLASS RIBBON

(71) Applicant: Corning Incorporated, Corning, NY (US)

(72) Inventors: Muhammad Haider Ali Basit, Corning, NY (US); Steven Marshall Eversole, Crab Orchard, KY (US); Nils Paul Fornell, Harrodsburg, KY (US); Allan Mark Fredholm, Vulaines sur Seine (FR); Misha Andre Gerschel, Corning, NY (US); James Tollef Gramstad, Danville, KY (US); Ching-Han Ho, Painted Post, NY (US); Craig Marshall Phenes, Danville, KY (US); Stephane Poissy, Brunoy (FR)

(73) Assignee: Corning Incorporated, Corning, NY (US)

( * ) Notice: Subject to any disclaimer, the term of this patent is extended or adjusted under 35 U.S.C. 154(b) by 705 days.

(21) Appl. No.: 16/647,207

(22) PCT Filed: Sep. 14, 2018

(86) PCT No.: PCT/US2018/051019
§ 371 (c)(1),
(2) Date: Mar. 13, 2020

(87) PCT Pub. No.: WO2019/055751
PCT Pub. Date: Mar. 21, 2019

(65) Prior Publication Data
US 2020/0290918 A1  Sep. 17, 2020

Related U.S. Application Data

(60) Provisional application No. 62/559,178, filed on Sep. 15, 2017.

(51) Int. Cl.
*C03B 33/023* (2006.01)
*C03B 33/027* (2006.01)
(Continued)

(52) U.S. Cl.
CPC ........ *C03B 33/0235* (2013.01); *B65G 49/061* (2013.01); *B65G 49/064* (2013.01);
(Continued)

(58) Field of Classification Search
None
See application file for complete search history.

(56) References Cited

U.S. PATENT DOCUMENTS 3,140,629 A   7/1964  Ingold
3,279,664 A   10/1966 Lynch
(Continued)

FOREIGN PATENT DOCUMENTS

CN   2741984 Y     11/2005
CN   102099306 A   6/2011
(Continued)

OTHER PUBLICATIONS

FR 2693184 machine translation, Reuter et al., Method and Device for Bending Glass Sheet, Jan. 1994 (Year: 1994).*
(Continued)

*Primary Examiner* — Queenie S Dehghan
(74) *Attorney, Agent, or Firm* — Matthew J. Mason

(57) ABSTRACT

Systems and methods for automated, sequential processing of a continuous glass ribbon by conveying the glass ribbon in a ribbon travel direction, forming a score line in the glass ribbon, separating a glass sheet from the glass ribbon at the score line while supporting the glass sheet with a transfer device, lowering the glass sheet onto a conveyor, and conveying the glass sheet in a sheet travel direction differing from the ribbon travel direction. By transferring and then
(Continued)

conveying the glass sheet in a direction differing from the ribbon travel direction (e.g., a 90 degree turn) immediately after glass sheet separation, the systems and method of the present disclosure are conducive to streamlined production of glass sheets utilizing a unique production floor footprint.

21 Claims, 28 Drawing Sheets

(51) Int. Cl.
*C03B 33/10* (2006.01)
*C03B 35/16* (2006.01)
*B65G 49/06* (2006.01)

(52) U.S. Cl.
CPC .......... *B65G 49/067* (2013.01); *C03B 33/027* (2013.01); *C03B 33/10* (2013.01); *C03B 35/16* (2013.01); *C03B 2225/02* (2013.01)

(56) References Cited

U.S. PATENT DOCUMENTS

| | | | |
|---|---|---|---|
| 4,072,259 A | 2/1978 | Welton | |
| 4,140,258 A | 2/1979 | Gray | |
| 4,495,845 A | 1/1985 | Sherby | |
| 5,086,907 A | 2/1992 | Nitschke et al. | |
| 10,246,365 B2 | 4/2019 | Bisson et al. | |
| 10,301,211 B2 | 5/2019 | Bigelow et al. | |
| 2010/0242702 A1 | 9/2010 | Tanise et al. | |
| 2014/0130649 A1* | 5/2014 | Chang | C03B 33/091 83/26 |

FOREIGN PATENT DOCUMENTS

| | | |
|---|---|---|
| CN | 105492396 A | 4/2016 |
| CN | 105800925 A | 7/2016 |
| CN | 205473369 U | 8/2016 |
| EP | 3055258 A1 | 8/2016 |
| JP | 49-019390 B | 5/1974 |
| JP | 52-131377 A | 11/1977 |
| JP | 54-159682 A | 12/1979 |
| JP | 03739333 B2 | 1/2006 |
| JP | 2009-107897 A | 5/2009 |
| JP | 05878623 B2 | 3/2016 |
| TW | 201628985 A | 8/2016 |
| TW | 201718174 A | 6/2017 |
| WO | 2012/090766 A1 | 7/2012 |
| WO | 2015/054329 A1 | 4/2015 |
| WO | 2015/072488 A1 | 5/2015 |

OTHER PUBLICATIONS

JP 2009107897 machine translation, Tanise et al., Device for scoring glass sheet, May 2009 (Year: 2009).*
Taiwanese Patent Application No. 107132404, Office Action, dated Mar. 2, 2022, 1 page; Taiwanese Patent Office.
International Search Report and Written Opinion of the International Searching Authority; PCT/US2018/051019; dated Nov. 26, 2018; 9 Pages; ISA/US Commissioner for Patents.
Japanese Patent Application No. 2020-515728, Office Action, dated Jun. 29, 2022, 12 pages (6 pages of English Translation and 6 pages of Original Copy); Japanese Patent Office.
Chinese Patent Application No. 201880064887.7, Office Action dated Feb. 9, 2022, 04 pages of English Translation, Chinese Patent Office.

* cited by examiner

SYSTEMS AND METHODS FOR PROCESSING A GLASS RIBBON

CROSS-REFERENCE TO RELATED APPLICATIONS

This application claims the benefit of priority under 35 U.S.C. § 371 of International Application Serial No. PCT/US2018/051019, filed Sep. 14, 2018, which claims the benefit of priority under 35 U.S.C. § 119 of U.S. Provisional Application Ser. No. 62/559,178 filed on Sep. 15, 2017, the contents of both of which are relied upon and incorporated herein by reference in their entirety.

BACKGROUND

Field

The present disclosure generally relates to systems and methods for processing a glass ribbon. More particularly, it relates to systems and methods for separating and conveying a glass sheet from a moving glass ribbon.

Technical Background

Production of glass sheets typically involves producing a glass ribbon from a molten glass material, and then cutting or separating individual glass sheets from the glass ribbon. Various techniques are known for producing the glass ribbon. For example, with a down-draw process (e.g., fusion draw process), the ribbon is drawn downward, typically from a forming body. Other glass making processes include, for example, float, up-draw, slot-style and Fourcault's-style processes. In yet other examples, the glass ribbon can be temporarily stored in roll form, and later unwound for subsequent cutting or separation of individual glass sheets. Regardless, cutting or separating of the individual glass sheets is typically performed at a location where the glass of the ribbon has been sufficiently cooled, and a viscosity reached where the ribbon has entered into an elastic state. More simply stated, the portion of the ribbon where the separation takes place is considered to be a solid.

Cutting or separating of a glass sheet from a glass ribbon can entail imparting a score line into a thickness of the glass ribbon (e.g., mechanical scoring, laser scoring, etc.), followed by breaking the glass ribbon along the score line to section a glass sheet from a remainder of the glass ribbon. With many glass sheet mass production lines in which glass ribbon is continuously supplied to automated scoring and separating stations, not only are the scoring and separating operations performed repeatedly and consistently on an otherwise constantly moving glass ribbon, but the resultant glass sheets are quickly removed to accommodate the next, newly sectioned glass sheet. Moreover, the operational steps are performed to avoid damaging the glass; this presents a significant constraint in the in-line system design process, especially when interfacing with glass that is still hot and more prone to defects. The physical constraints associated with a particular manufacturing facility can make it difficult to install an in-line system capable of providing each of the automated glass ribbon transporting, scoring, separating, and glass sheet transporting operations.

Accordingly, systems and methods for processing a glass ribbon, for example forming glass sheets from a continuously supply of a glass ribbon, are disclosed herein.

SUMMARY

Some embodiments of the present disclosure relate to a system for processing a glass ribbon. The system comprises a glass ribbon conveying device, a glass scoring device, a glass sheet conveying device and a transfer device. The glass ribbon conveying device comprises an upstream end opposite a downstream end, and establishes a ribbon travel direction from the upstream end to the downstream end. The glass scoring device is operatively associated with the glass ribbon conveying device between the upstream and downstream ends. The glass sheet conveying device comprises an upstream section located adjacent the downstream end of the glass ribbon conveying device. The upstream section comprises a sheet support face and establishes a sheet travel direction. The sheet travel direction differs from the ribbon travel direction. In some embodiments, the sheet travel direction is perpendicular to the ribbon travel direction. The transfer device comprises a receiving surface and an actuator assembly operable to transition the receiving surface between a first vertical position and a second vertical position. The first vertical position includes the receiving surface located above the sheet support face (e.g., for receiving a glass ribbon from the glass ribbon conveying device). The second vertical position includes the receiving surface located below the sheet support face (e.g., for placing a glass sheet onto the sheet support face). With some systems of the present disclosure, glass ribbon can be handled, scored, and separated for subsequent processing on a mass production basis while occupying a unique footprint of a production facility. In some embodiments, the systems of the present disclosure can automatically generate differently-dimensioned glass sheets from a uniformly sized glass ribbon. In yet other embodiments, the glass scoring device can comprise one or more cutting apparatuses each with a cutting member supported by a caster assembly that are optionally carried by a replaceable turret.

Yet other embodiments of the present disclosure relate to a method for processing a glass ribbon. The method comprises conveying a glass ribbon along a glass ribbon conveying device in a ribbon travel direction toward a downstream end of the glass ribbon conveying device. The downstream end is opposite an upstream end. A score line is imparted into the conveyed glass ribbon by a glass scoring device. A glass sheet is separated from the conveyed glass ribbon. An end of the glass sheet is defined at the score line. The glass sheet is located on a sheet support face of an upstream section of a glass sheet conveying device with a transfer device. In this regard, the transfer device comprises a receiving surface and an actuator assembly operable to transition the receiving surface between a first vertical position and a second vertical position. The first vertical position comprises the receiving surface located above the sheet support face, and the second vertical position comprises the receiving surface located below the sheet support face. With this in mind, the step of locating the glass sheet comprises transitioning the receiving surface from the first vertical position to the second vertical position. The glass sheet is conveyed along the upstream section of the glass sheet conveying device in a sheet travel direction that differs from the ribbon travel direction. In some embodiments, the step of separating the glass sheet comprises directed pressurized gas onto the score line as the glass ribbon is continuously conveyed.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Figure 1:
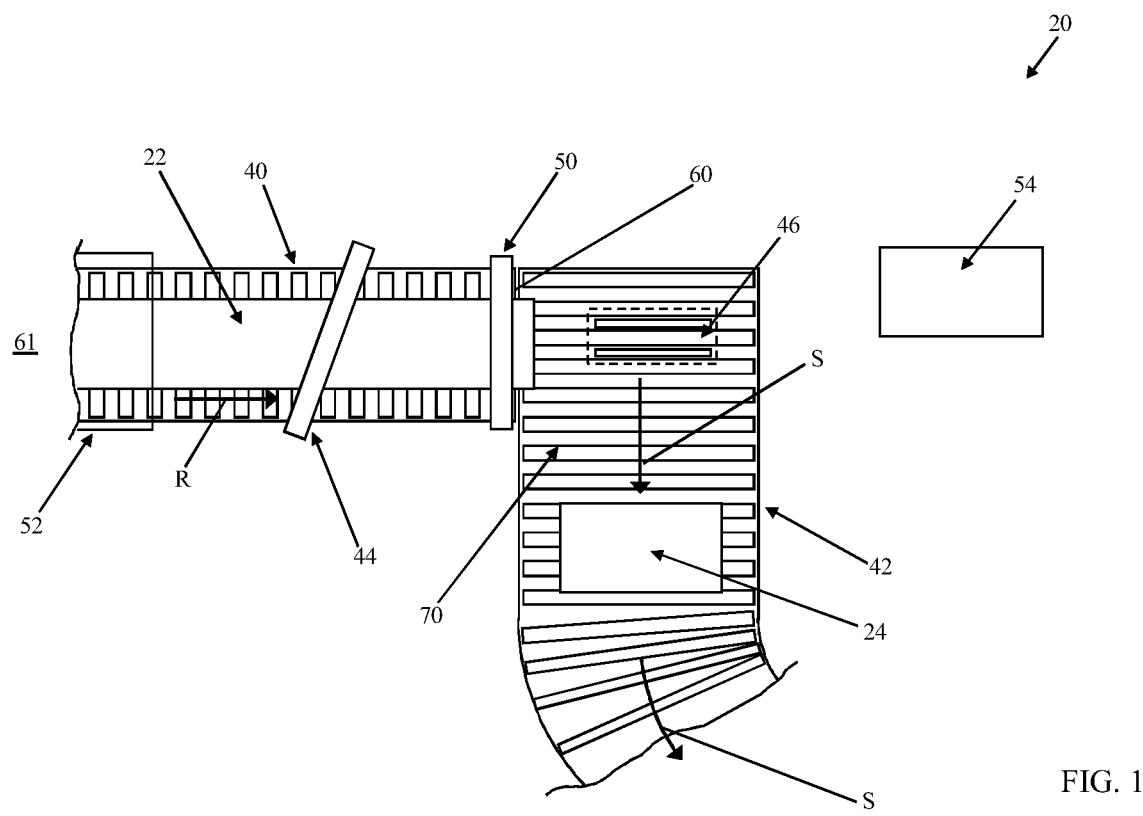
FIG. 1 is a simplified top plan view of a system in accordance principles of the present disclosure operating to process a glass ribbon.

Reference will now be made in detail to various embodiments of systems and methods for processing a glass ribbon. Whenever possible, the same reference numerals will be used throughout the drawings to refer to the same or like parts.

FIG. 1 shows an exemplary system 20 in accordance with principles of the present disclosure and useful in processing a glass ribbon 22, for example in forming one or more glass sheets 24. Although the system 20 is described herein as being used to process a glass ribbon, it should be understood that the systems and methods of the present disclosure can also be used to process other types of materials such as polymers (e.g., Plexi-Glass™), metals, or other substrate sheets.

The system 20 includes a glass ribbon conveying device 40, a glass sheet conveying device 42, a scoring device 44, and a transfer device 46 (referenced generally). Details on the various components are provided below. In general terms, the glass ribbon conveying device 40 continuously conveys the glass ribbon 22 from a glass ribbon supply (not shown) in a ribbon travel direction R. The scoring device 44 periodically imparts a score line into the glass ribbon 22 as the glass ribbon 22 travels along the glass ribbon conveying device 40. An individual glass sheet 24 is separated from a remainder of the glass ribbon 22 at the score line; with continuous conveyance of the glass ribbon 22, then, individual glass sheets 24 are sequentially formed. Each glass sheet 24 is transferred to the glass sheet conveying device 42 by the transfer device 46. The glass sheet conveying device 42 conveys the received glass sheet 24 away from the glass ribbon conveying device 40 in a sheet travel direction S that differs, at least along an upstream section of the glass sheet conveying device 42, from the ribbon travel direction R. With the systems and corresponding methods of the present disclosure, glass sheets are automatically formed and transported on a mass production basis from a continuous supply of glass ribbon while occupying a relatively compact footprint within the manufacturing facility. As described below, the systems of the present disclosure can optionally include one or more additional devices or apparatuses, such as, for example, a separation initiation device 50, a lead-in device 52, a controller 54, one or more inspection devices, etc.

Conveying Devices 40, 42

Figure 2:
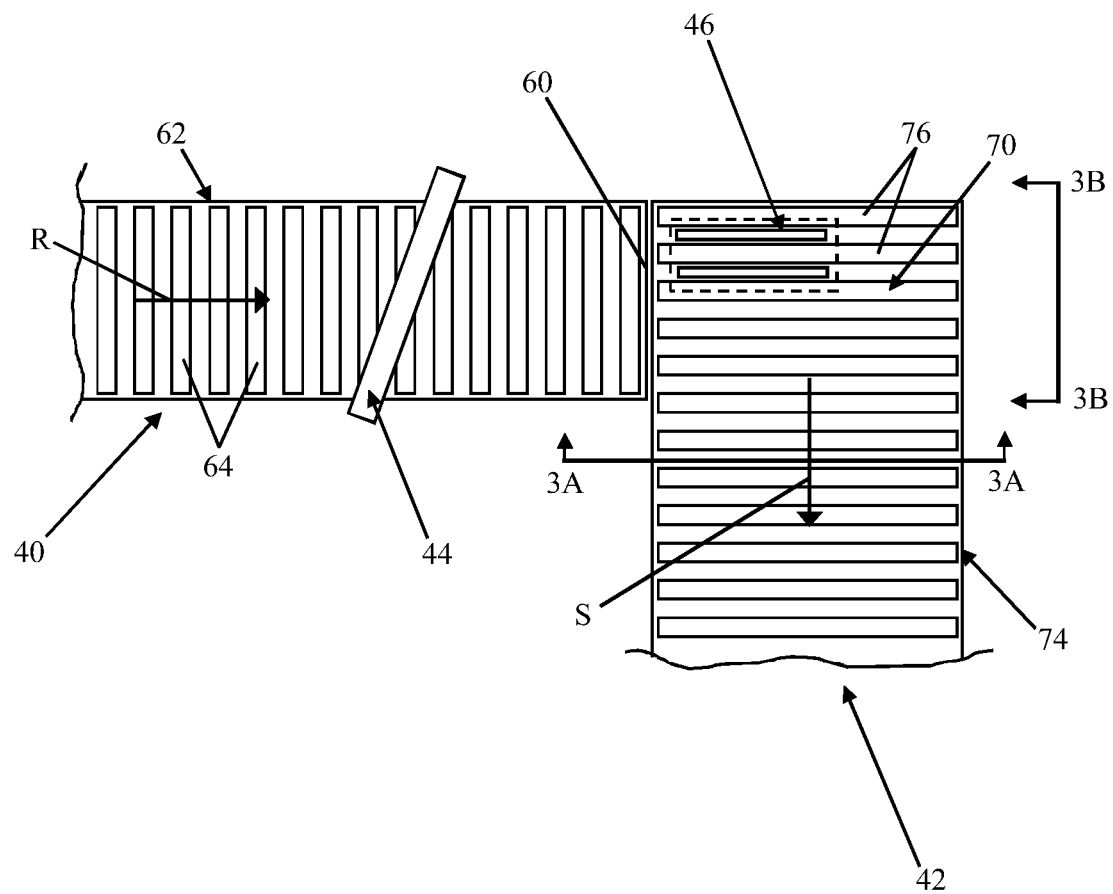
FIG. 2 is a top plan view of portions of the system of FIG. 1, including a glass ribbon conveying device, a glass sheet conveying device, a glass scoring device, and a transfer device.

With additional reference to the view of FIG. 2 in which portions of the illustration of FIG. 1 are omitted for ease of understanding, the glass ribbon conveying device 40 can assume a variety of forms appropriate for conveying a continuous length of the glass ribbon 22 in the ribbon travel direction R. As a point of reference, the glass ribbon conveying device 40 can be viewed as having or defining a downstream end 60 opposite an upstream end 61 (referenced generally in FIG. 1); the ribbon travel direction R is from the upstream end 61 to the downstream end 60. The glass ribbon conveying device 40 can include a conveyor 62 having a plurality of rollers 64 formatted for conveying the glass ribbon 22. For example, the rollers 64 can each comprise or exhibit a material, stiffness, surface coating, etc., appropriate for directly contacting the glass ribbon 22 in a manner that does not overtly negatively affect desired properties of the glass ribbon 22. In some embodiments, the glass ribbon 22 is provided to the system 20, and in particular to the upstream end 61 of the glass ribbon conveying device 40, immediately or nearly immediately after being formed; under these and other conditions, the rollers 64 can be formatted to maintain their structural integrity when in contact with the hot glass ribbon (e.g., on the order of 500° C. or more). Some or all of the rollers 64 can be driven rollers of a type known to one of ordinary skill. Other conveying formats are also acceptable, such as a belt conveyor, non-contact conveyor (e.g., air bearing), etc. With these and similar configurations, the glass ribbon conveying device 40 can further include a controller, such as the controller 54, for example a computer-like device, programmable logic controller, etc., programmed to dictate or control a speed or travel rate of the glass ribbon 22 along the glass ribbon conveying device 40.

The glass sheet conveying device 42 can also assume a variety of forms appropriate for conveying consecutive glass sheets 24. The glass sheet conveying device 42 can be viewed as defining an upstream section 70 that is located immediately adjacent the downstream end 60 of the glass ribbon conveying device 40. The sheet travel direction S is established by operation of the glass sheet conveying device 42; at least along the upstream section 70, the sheet travel direction S differs from the ribbon travel direction R. In some embodiments, the sheet travel direction S along the upstream section 70 is substantially perpendicular (i.e., within 5 degrees of a truly perpendicular relationship) to the ribbon travel direction R. As generally reflected by FIG. 1, the sheet travel direction S can vary or change along a length of the glass sheet conveying device 42 downstream of the upstream section 70 (e.g., the glass sheet conveying device 42 can effect one or more turns in the downstream travel path). Alternatively or additionally, the glass sheet conveying device 42 can effect a change in vertical elevation (e.g., a downstream section (not shown) of the glass sheet conveying device 42 can decline or incline in the downstream direction). In some embodiments, the glass sheet conveying device 42 can include a conveyor 74 having a plurality of rollers 76 formatted for conveying the glass sheets 24. For example, the rollers 76 can each comprise or exhibit a material, stiffness, surface coating, etc., appropriate for directly contacting the glass sheets 24 in a manner that does not overtly negatively affect desired properties of the glass sheets 24. Some or all of the rollers 76 can be driven rollers of a type known to one of ordinary skill. Other conveying formats are also acceptable, such as a belt conveyor, non-contact conveyor, etc. With these and similar configurations, the glass sheet conveying device 42 can further include a controller, such as the controller 54, for example a computer-like device, programmable logic controller, etc., programmed to dictate or control a speed or travel rate of the glass sheets 24 along the glass ribbon conveying device 42.

Figure 3A:
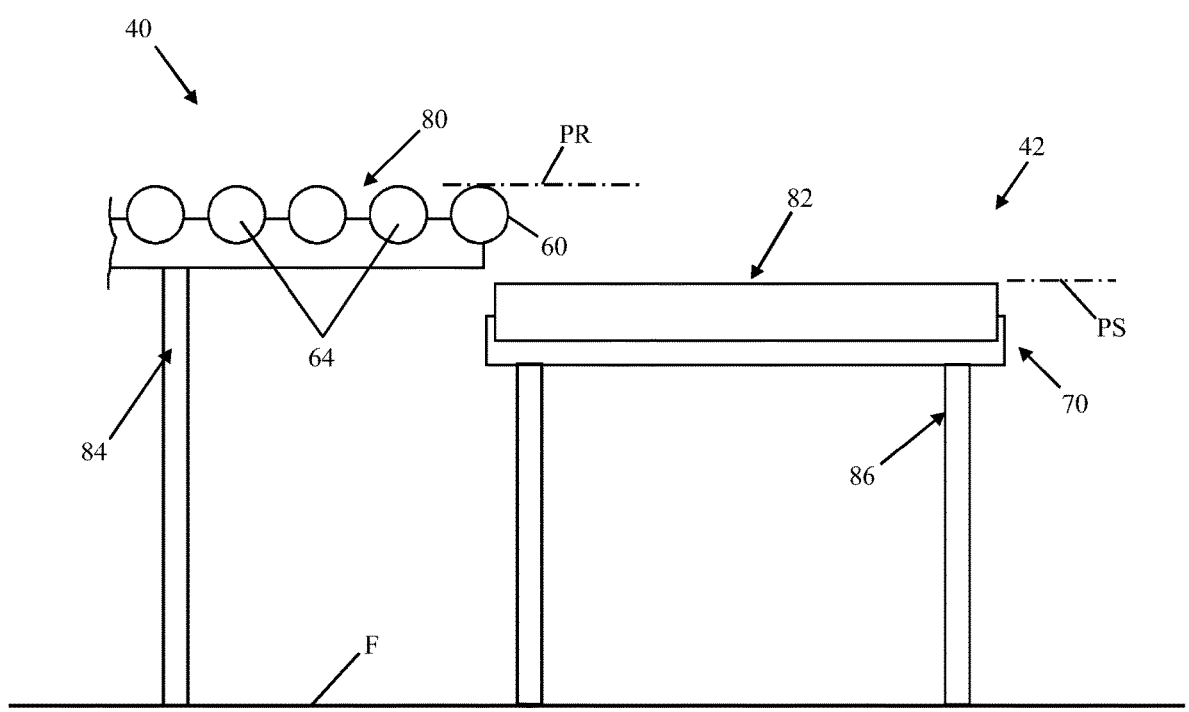
FIG. 3A is a simplified side view of a portion of the system of FIG. 2, taken along the line 3A-3A.
Figure 3B:
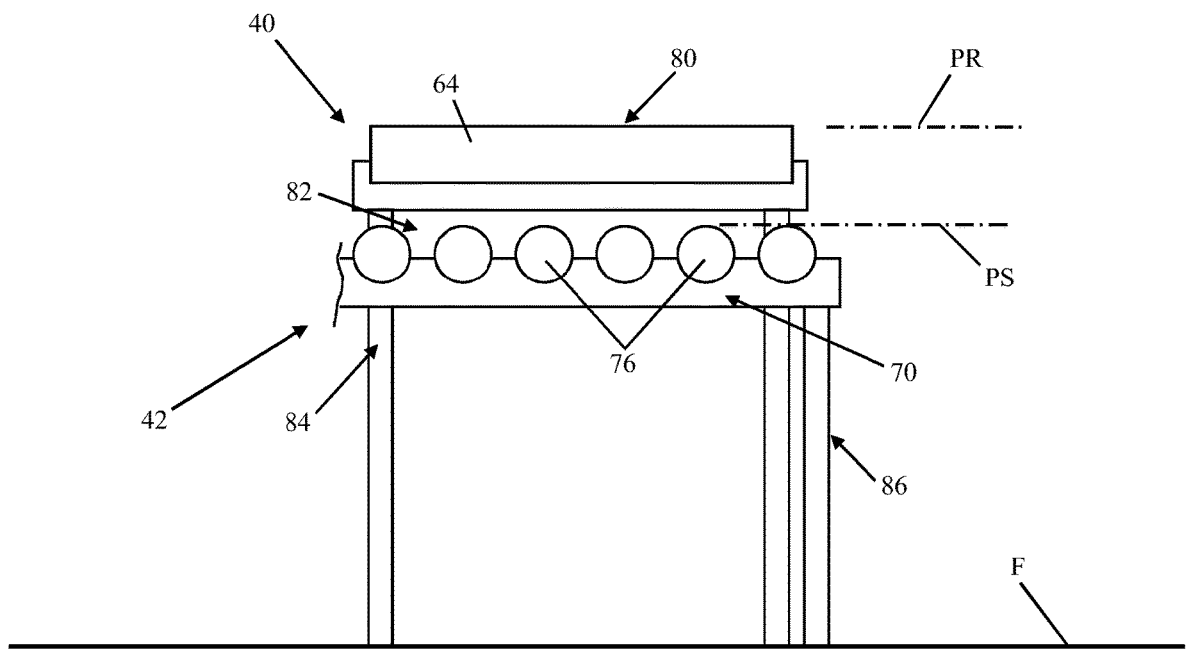
FIG. 3B is a simplified end view of a portion of the system of FIG. 2, taken along the line 3B-3B.

A spatial relationship between conveying surfaces associated with the glass ribbon conveying device 40 and the glass sheet conveying device 42 in accordance with some non-limiting embodiments are further reflected in the simplified illustrations of FIGS. 3A and 3B (in which the transfer device 46 is omitted for ease of understanding). The glass ribbon conveying device 40 establishes a ribbon support face 80 (referenced generally) along which the glass ribbon 22 (FIG. 1) is received (e.g., the glass ribbon 22 is located on or supported by the ribbon support face 80). For example, where the glass ribbon conveying device 40 includes the plurality of rollers 64 for conveying the glass ribbon 22, the rollers 64 collectively define the ribbon support face 80. Similarly, the glass sheet conveying device 42 establishes a sheet support face 82 (referenced generally) along which the glass sheets 24 (FIG. 1) are received (e.g., the glass sheets 24 are located on or supported by the sheet support face 82). With embodiments in which at least the upstream section 70 of the glass sheet conveying device 42 includes the plurality of rollers 76, the rollers 76 collectively define the sheet support face 82. With these definitions in mind, FIGS. 3A and 3B clarify that in some embodiments, the ribbon support face 80, at least at the downstream end 60 of the glass ribbon conveying device 40, is vertically above the sheet support face 82 (at least at the upstream section 70). For example, the glass ribbon conveying device 40 can include framework 84 (referenced generally) that fixes the ribbon support face 80 (e.g., maintains the rollers 64) at a predetermined elevation relative to a floor F of the production facility at which the system 20 is installed. The glass sheet conveying device 42 similarly can include framework 86 (referenced generally) that fixes the sheet support face 82 (e.g., maintains the rollers 76) at a predetermined elevation relative to the floor F. With this arrangement, a major plane PR of the ribbon support face 80 is vertically spaced above a major plane PS of the sheet support face 82 (at least as the major planes PR, PS are established at the downstream end 60 of the glass ribbon conveying device 40 and the upstream section 70 of the glass sheet conveying device 42, respectively). While the major plane PR of the ribbon support face 80 is illustrated as being substantially horizontal (or parallel with the floor F), in some embodiments the ribbon support face 80 can have a slight inclined angle (relative to horizontal) at the downstream end 60 for reasons made clear below.

Glass Scoring Device 44

Returning to FIGS. 1 and 2, the glass scoring device 44 is generally configured to impart a score line (e.g., a crack) into a surface of the continuously moving glass ribbon 22. Components of one non-limiting embodiment of the glass scoring device 44 useful with the systems and methods of the present disclosure are shown in greater detail in FIG. 4. The glass scoring device 44 can include at least one cutting apparatus 100 (referenced generally), a carriage assembly 102, a track 104, a linear actuator assembly 106, a depth actuator assembly 108, a force adjustment mechanism 110, a vacuum assembly 112, and a housing 114. In general terms, the cutting apparatus 100 is connected to the carriage assembly 102. The linear actuator assembly 106 operates to articulate or move the carriage assembly 102 along the track 104. The depth actuator assembly 108 operates to effectuate vertical (z-direction) movement of the cutting apparatus 100, whereas the force adjustment mechanism 110 operates to fine tune a downward pressure or force applied at the cutting apparatus 100. The vacuum assembly 112 operates to evacuate debris from a region of the cutting apparatus 100 during a scoring operation. Operation of one or more of the linear actuator assembly 106, the depth actuator assembly 108, the force adjustment mechanism 110, the vacuum assembly 112, and/or other automated components of the scoring device 44 can be prompted or commonly controlled by a controller, such as the controller 54 of FIG. 1. The housing 114 supports at least the track 104 and the actuator assemblies 106, 108. Further, the housing 114 can provide a heat shield for electrical components of the actuator assemblies 106, 108. As described in greater detail below, a cooling medium can be provided to the glass scoring device 44, external or internal the housing 114.

Figure 5A:
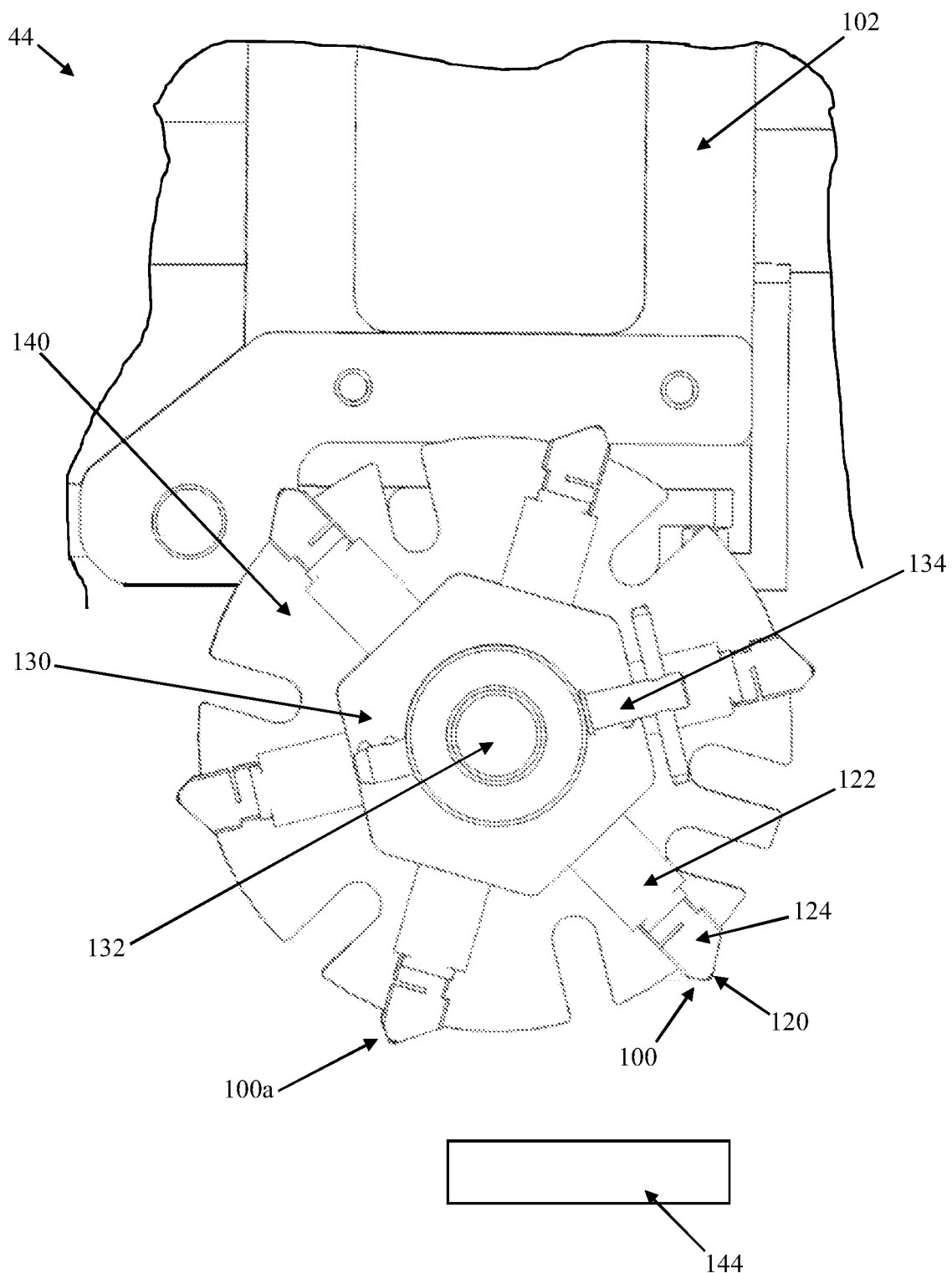
FIG. 5A in an enlarged perspective view of a portion of the glass scoring device of FIG. 4 and illustrating cutting apparatuses useful with the glass scoring device.

With reference to FIG. 5A, the at least one cutting apparatus 100 can assume various forms appropriate for imparting a score line into glass, and includes a scoring member 120, such as a score wheel, scribe or abrasive as understood by one of ordinary skill. The scoring member 120 can be maintained relative to the carriage assembly 102 (referenced generally) in a variety of fashions. For example, in some embodiments, the cutting apparatus 100 further includes a support shaft 122 and a caster assembly 124. The caster assembly 124 connects the scoring member 120 to the support shaft 122 such that the scoring member 120 can rotate and can swivel relative to the support shaft 122. For example, the caster assembly 124 can better follow the direction of scoring or cutting being performed by the scoring member 120, can adjust for a slight change in the scoring angle, can roll on top of the glass ribbon 22 to prevent a rough cut, and/or can be self-aligning. In other embodiments, the caster assembly 124 can be omitted. Other scoring member 120 connection constructions are also acceptable.

In some embodiments, the scoring device 44 can include two or more of the cutting apparatuses 100 (e.g., six cutting apparatuses in the non-limiting embodiment of FIG. 5A), each of which can have the same general construction as described above. With these and other embodiments, each of the cutting apparatuses 100 can be commonly connected to a turret 130, that in turn is selectively coupled to a shaft 132 provided with the carriage assembly 102. With this exemplary configuration, the turret 130 is rotated (e.g., the turret 130 is prompted to rotate by an actuator (e.g., the turret 130 is coupled to a ratchet wheel (not shown); the linear actuator 106 moves the turret 130 to a turret rotate stop 133 (FIG. 4) mounted on the conveyor frame 40 (FIG. 1) that causes the ratchet wheel to rotate) so as to position a particular one of the cutting apparatuses 100 in a scoring location for imparting a score line into the glass ribbon 22 (FIG. 1) traveling along the glass ribbon conveying device 40 (FIG. 1) (i.e., the cutting apparatus identified at 100a in FIG. 5A is in the scoring location). As the scoring member 120 of the so-positioned cutting apparatus 100a becomes worn over time, the turret 130 can then be automatically rotated (with minimal operator interaction and line down time) to position a different one of the cutting apparatuses in the scoring location. A sensor (not shown) is optionally included to assisting in confirming a desired rotational position of the turret 130. When desired, the turret 130 (including all of the cutting apparatuses 100 carried thereby) can be replaced with a new turret 130 carrying "new" cutting apparatuses 100. Coupling of the turret 130 to the shaft 132 can be provided, for example, by a pin 134 (e.g., the pin 134 extends through a collar of the turret 130 and is threadably connected to the shaft 132). Other mounting configurations are also acceptable.

As reflected by FIG. 5A, the glass scoring device 44 can optionally include a guard plate 140. The guard plate 140 is located immediately adjacent the cutting apparatuses 100, and is sized and shaped to protect the turret 130 from heat of the glass ribbon 22 and to indicate a rotational position of the turret 130. In other embodiments, the guard plate 140 can be omitted. FIG. 5A further illustrates that the glass scoring device 44 can optionally include an oil scoring assembly comprising, for example, a well 144 (for ease of explanation, the well 144 is not shown in FIG. 4). As a point of reference, the view of FIG. 5A represents a "home" position of the carriage assembly 102 along the track 104; the carriage assembly 102 is directed to the home position prior to a scoring operation. With this in mind, the well 144 is retained (e.g., is mounted to the glass ribbon conveying device 40 (FIG. 1)) at a location that, with the carriage assembly 102 in the home position, is below the turret 130 and in general alignment with the cutting apparatus 100 that is otherwise in the scoring location (i.e., the cutting apparatus 100a in FIG. 5A). Oil (or optionally any other cooling or lubricating liquid) can be supplied to the well 144 from a supply chamber (not shown). Prior to a scoring operation (and with the carriage 102 in the home position), the scoring device 44 can be operated to dip the scoring member 120 of the cutting apparatus 100 positioned in an oil dipping location into the oil within the well 144 for improved scoring performance. For example, the depth actuator assembly 106 (FIG. 4) can be operated to effect automated vertical lowering followed by raising of the cutting apparatus 100a relative to the well 144. In other embodiments, the oil scoring assembly can be omitted.

Figure 4:
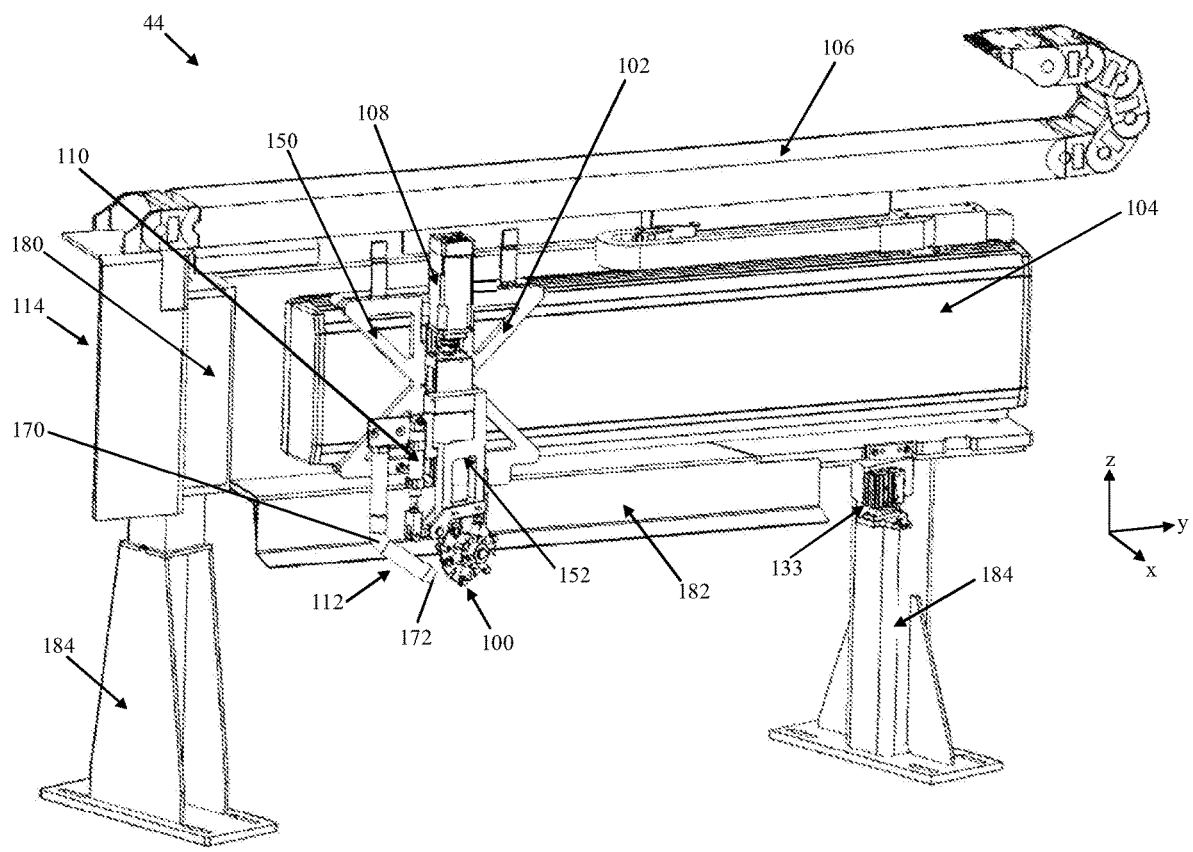
FIG. 4 is an enlarged perspective view of a glass scoring device useful with the system of FIG. 1.

With reference to FIG. 4, the carriage assembly 102 can include a carriage 150 and framework 152. The carriage 150 is configured for sliding engagement with the track 104, and the carriage assembly 102 can include or carry one or more components that promote translation of the carriage 150 along the track 104 such as, for example, rollers, ball bearings, etc. The framework 152 can assume various forms and is attached to or formed with the carriage 150, configured to maintain various other components of the glass scoring device 44, such as the depth actuator assembly 108, the force adjustment mechanism 110, the optional turret 130, etc.

The track 104 is configured to slidably receive the carriage 150, and establishes a scoring path during a scoring a scoring operation (i.e., during a scoring operation, the carriage 150, and thus the cutting apparatus 100 carried thereby, is driven along a travel path of the track 104). In some embodiments, the track 104 provides a linear scoring path that is arranged at a non-perpendicular and non-parallel angle relative to the glass ribbon travel direction R (FIG. 2) for reasons made clear below.

Figure 6A:
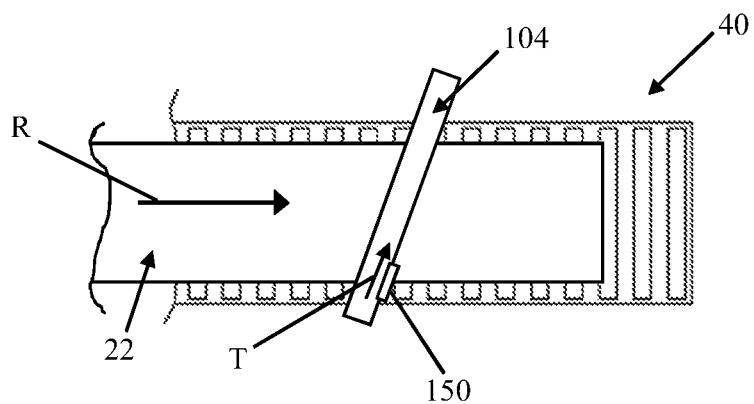
FIGS. 6A-6C are simplified top plan views illustrating operation of the glass scoring device of FIG. 1 imparting a score line into a glass ribbon.
Figure 6B:
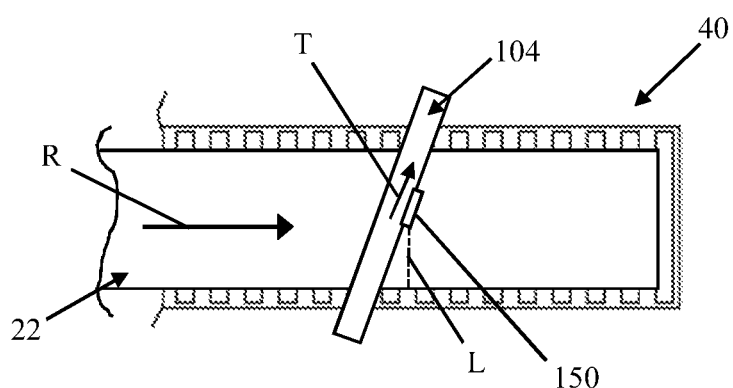
Figure 6C:
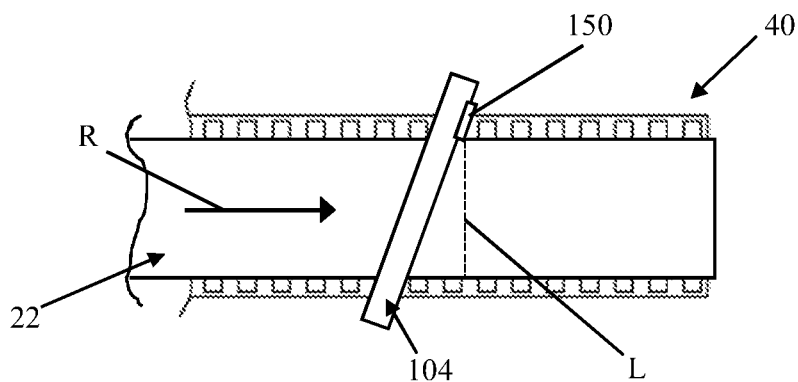

The linear actuator assembly 106 is configured to dictate a position of the carriage 150 relative to, and drive the carriage 150 along, the track 104. Thus, the linear actuator assembly 106 is connected to the carriage 150 and can assume various forms apparent to one of skill (e.g., servo motor-based). In some embodiments, the linear actuator assembly 106 includes, or is electronically connected to, a controller, such as the controller 54 of FIG. 1, akin to or including a computing device, such as a PLC, HMI, etc. The controller can be programmed to synchronize a speed of travel of the carriage 150 along the track 104 with a speed of the glass ribbon 22 (FIG. 1) traveling along the glass ribbon conveying device 40. By way of further explanation, FIGS. 6A-6C illustrate, in simplified form, movement of the carriage 150 along the track 104 relative to the glass ribbon 22 otherwise being conveyed or traveling along the glass ribbon conveying device 40. The glass ribbon 22 is traveling in the glass ribbon travel direction R at a known rate or speed. FIG. 6A represents a location of the carriage 150 relative to the track 104 at the start of a scoring operation. During the scoring operation, the carriage 150 will be actuated to move in a linear scoring travel path T along the track 104. As mentioned previously, the track 104 is arranged such that scoring travel path T is at angle (non-perpendicular and non-parallel) relative to the glass ribbon travel direction R. As movement of the carriage 150 is initiated, the cutting apparatus 100 (hidden) imparts a score line L into the glass ribbon 22, as shown in FIG. 6B. By arranging the scoring travel path T at an angle relative to the glass ribbon travel direction R and by synchronizing a speed of the carriage 150 along the scoring travel path T with a speed of the glass ribbon 22, the score line L is perpendicular to a length (or glass ribbon travel direction R) of the glass ribbon 22. Upon completion of the scoring operation (FIG. 6C), the score line L is formed across a width of the glass ribbon 22, and is substantially perpendicular to the glass ribbon length or glass ribbon travel direction R. The glass ribbon conveying device 40 speed and a trigonometry function can be used to determine the scoring travel path speed to produce a square (perpendicular) score line.

Returning to FIG. 4, the depth actuator assembly 108 is configured to dictate a position of the framework 152 relative to the carriage 150 in the z or depth direction (e.g., controlling movement of the cutting apparatus(es) 100 relative to the glass ribbon 22 (FIG. 1) traversing the glass ribbon conveying device 40). Thus, the depth actuator assembly 108 is connected to the framework 152 and can assume various forms apparent to one of skill (e.g., servo motor-based). In some embodiments, the depth actuator assembly 108 can include or be electronically connected to a controller, such as the controller 54 of FIG. 1, akin to or including a computing device, such as a PLC, HMI, etc. The controller can be programmed to prompt operation of the depth actuator assembly 108 in effecting gross z or depth direction movements of the framework 152, and thus of the cutting apparatus(es) 100.

Figure 5B:
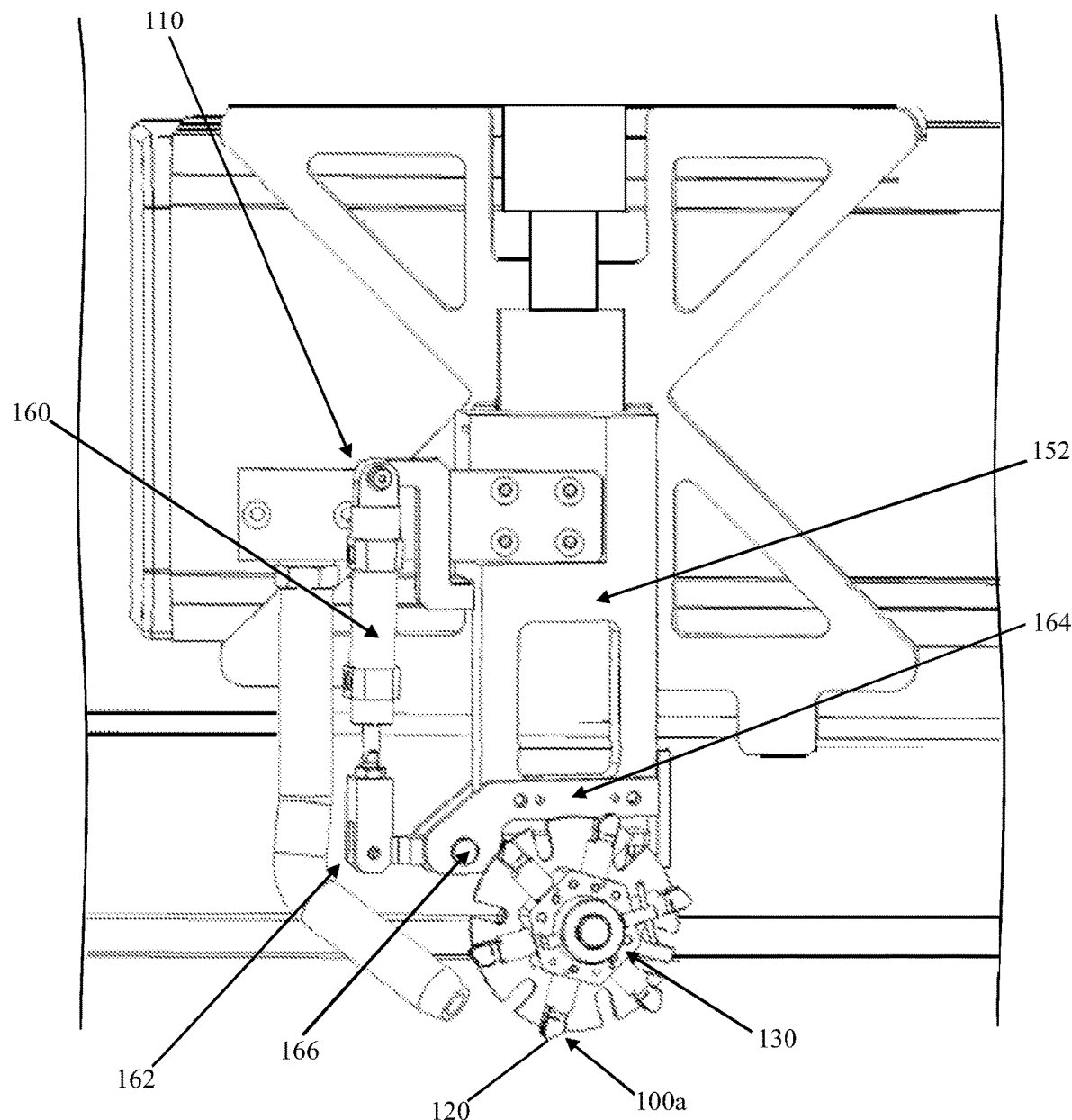
FIG. 5B is an enlarged perspective view of a portion of the glass scoring device of FIG. 4.

Fine tuning of a downward force applied onto the cutting apparatus 100a otherwise in the scoring position can be provided by the force adjustment mechanism 110. As a point of reference, the glass ribbon 22 (FIG. 1) inherently exerts resistive forces onto the scoring member 120 (FIG. 5A) during a scoring operation. The level or magnitude of these resistive forces can vary as a function of various parameters, such as glass ribbon composition, temperature, line speed, scoring member wear, etc. In some instances, then, the depth and/or uniformity of the score line imparted by the scoring member 120 can be improved or controlled by selectively applying a downward force onto the cutting apparatus 100a, and thus the scoring member 120, via the force adjustment mechanism 110. With reference to FIG. 5B, in some embodiments, the force adjustment mechanism 110 includes a biasing device 160 and a linkage 162. The biasing device 160 is generally configured to selectively exert a force onto the linkage 162 as described below. In some embodiments, the biasing device 160 can be or include a pneumatic cylinder device in which air (or other fluid) controls movement of a piston. Other constructions are equally acceptable (e.g., a spring). The linkage 162 includes a lever arm 164 that is pivotably connected to the framework 152 at a pivot point or fulcrum 166. The lever arm 164 is connected to the biasing device 160 at one side of the pivot point 166, and is adapted to interface with the turret 130 at an opposite side of the pivot point 166. With this construction, a lifting force applied by the biasing device 160 onto the lever arm 164 creates a downward force or pressure onto the turret 130, and in turn onto the scoring member 120 of the cutting apparatus 100a otherwise in the scoring position. In some embodiments, the force adjustment mechanism 110 can include or be electronically connected to a controller, such as the controller 54 of FIG. 1, akin to or including a computing device, such as a digital precision proportional regulator, PLC, HMI, etc., that is programmed to control operation of the biasing device 160. In other embodiments, pressure or downward force control can be provided with other mechanisms, such as a spring-based device. In yet other embodiments, the force adjustment mechanism 110 can be omitted.

Returning to FIG. 4, the vacuum assembly 112 includes a line or tubing 170 connected to the carriage assembly 102. The tubing 170 terminates at an open, first end 172 that is maintained in relatively close proximity to the turret 130 (FIG. 5A), and in particular the cutting apparatus 100a otherwise located in the scoring position. An opposite, second end (not shown) of the tubing 170 is in fluid communication with a source of negative pressure or vacuum (not shown). With this construction, the vacuum assembly 112 operates to remove or evacuate debris (e.g., glass chips or dust) generated during a scoring operation.

Figure 5C:
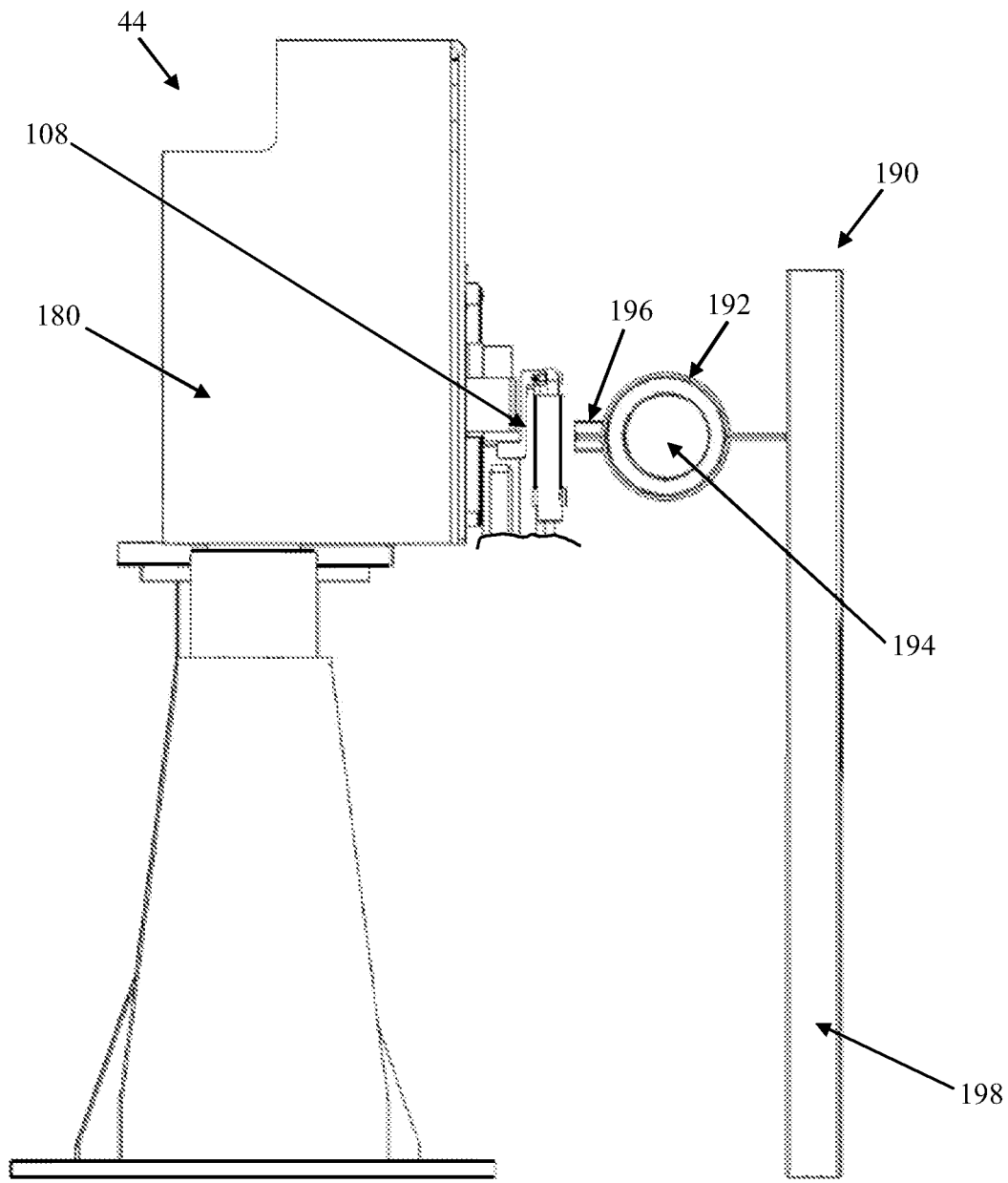
FIG. 5C is a side view of the glass scoring device of FIG. 4 and a portion of a cooling device.

The housing 114 is connected to and supports at least the track 104. In some embodiments, the linear actuator assembly 106 is mounted to the track 104; further, the depth actuator assembly 108 is mounted to the carriage assembly 102 that in turn is connected to the track 104. With this in mind, the housing 114 can include a shroud 180 and a shield 182. The shroud 180 is coupled to support legs 184, and maintains the shield 182 as well as other components of the glass scoring device 44 such as the track 104. The shield 182 serves as a heat shield, presenting a barrier between the actuator assembly 108 and heat radiating from the glass ribbon 22 (FIG. 1). Additional cooling can be provided, for example, by an optional blower unit 190, a portion of which is shown in FIG. 5C. The blower unit 190 includes an air knife 192 defining a chamber 194 and outlets 196. A source of pressurized fluid (not shown), such as air or other cooling medium, is fluidly connected to the chamber 194 that in turn directs the cooling medium to the outlets 196. The air knife 192 is maintained by a stand 198. Upon final assembly, the outlets 196 are spatially arranged to direct the cooling medium at a desired location relative to the scoring device 44, for example onto the depth actuator assembly 108. The scoring device 44 can incorporate other features that promote cooling of the various components, such as the depth actuator assembly, for example by providing a cooling medium pathway into an interior of the shroud 180.

The scoring device 44 can optionally include one or more additional components not otherwise shown in FIGS. 4-5C. For example, a hold down roller can be provided and located to contact the glass ribbon 22 immediately upstream of the scoring travel path T (FIG. 6A), immediately downstream of scoring travel path T, or both. Edge guides for minimizing or preventing over transverse movement of the glass ribbon 22 can also be provided. In other embodiments, the scoring device 44 can assume a wide variety of other forms appropriate for imparting a score line into the glass ribbon 22 that may or may not include one or more of the components described above. For example, the scoring device 44 can be configured to effectuate a full thickness cut through the glass ribbon 22 (e.g., by a laser cutting mechanism).

Transfer Device 46

Figure 7A:
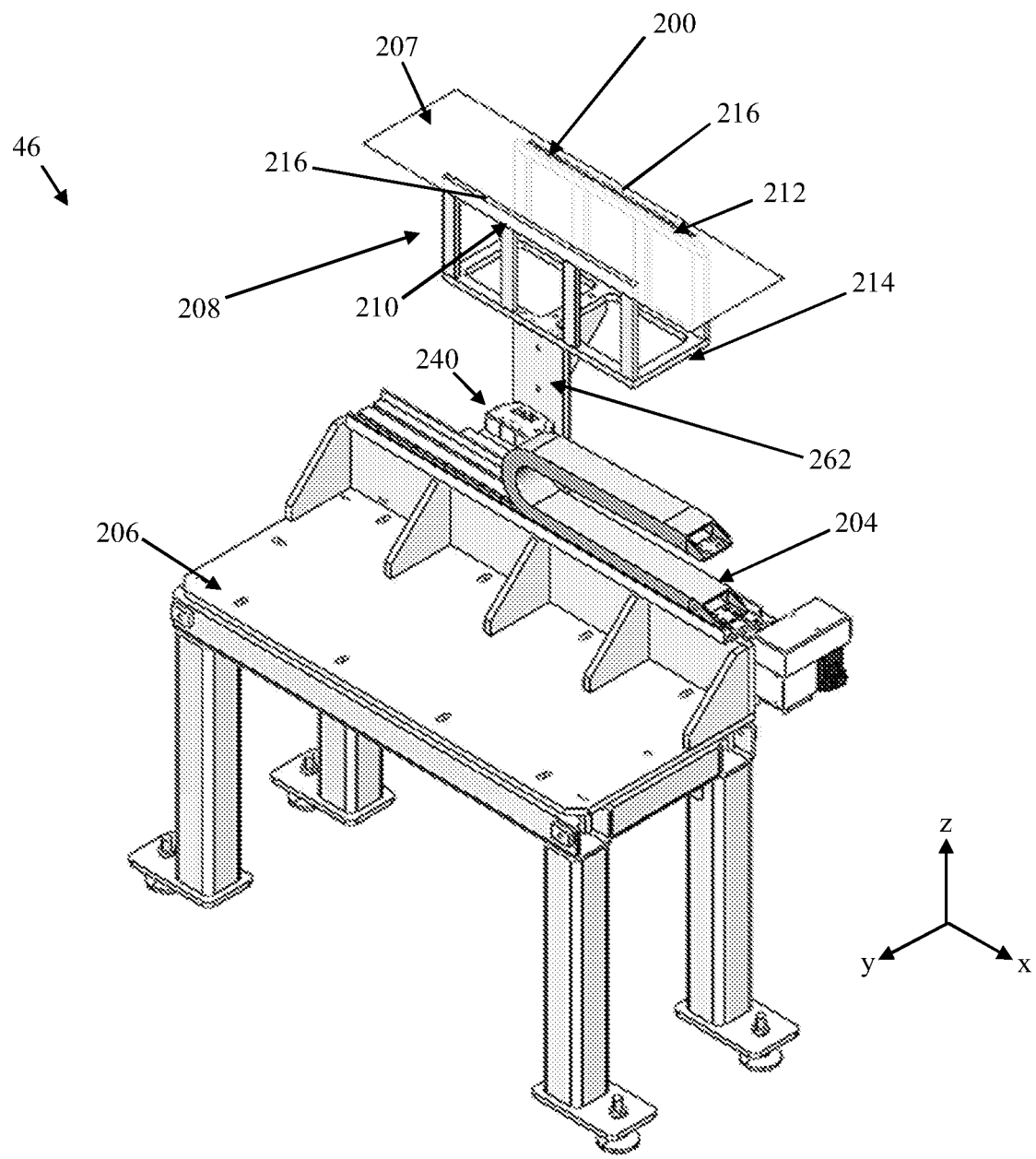
FIG. 7A is a front perspective view of a transfer device useful with the system of FIG. 1.
Figure 7B:
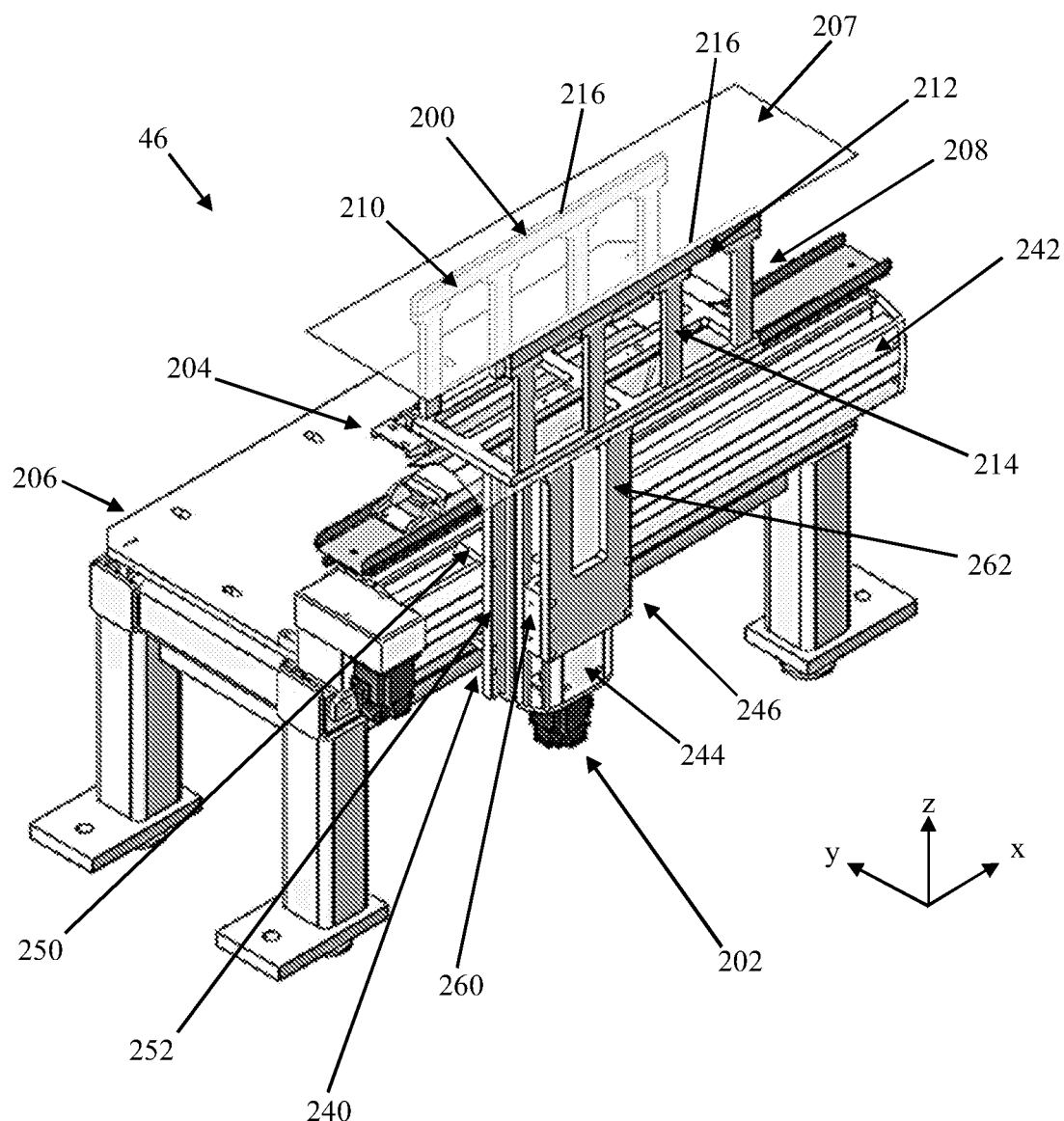
FIG. 7B is a rear perspective view of the transfer device of FIG. 7A.
Figure 7C:
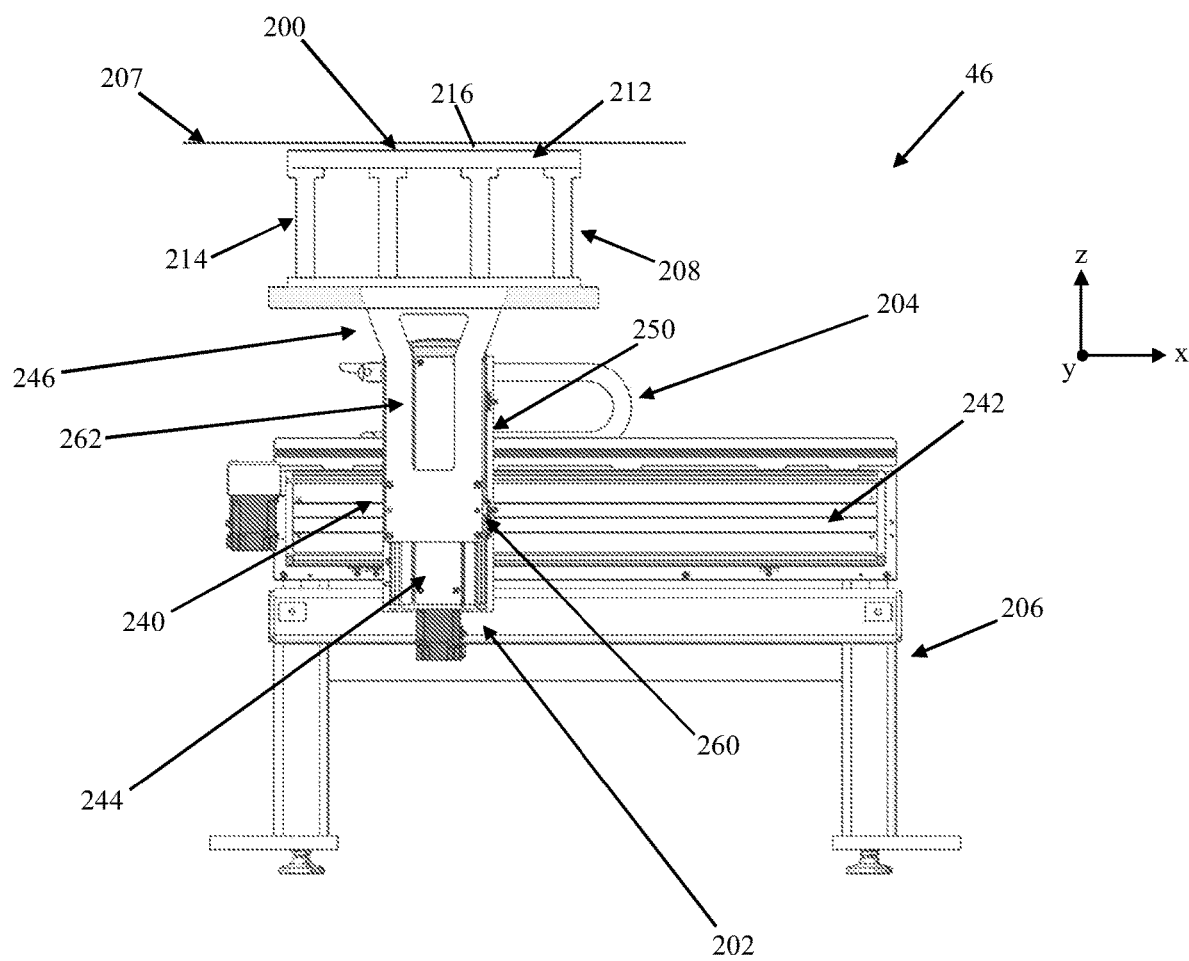
FIG. 7C is a rear plan view of the transfer device of FIG. 7B.

Returning to FIG. 1, the transfer device 46 is located downstream of the scoring device 44, and is generally configured to transition individual ones of the glass sheets 24 onto the glass sheet conveying device 42. An exemplary transfer device 46 in accordance with principles of the present disclosure is shown in greater detail in FIGS. 7A-7C, and includes a receiving surface 200 (referenced generally), at least one actuator assembly, such as a vertical actuator assembly 202 and/or a horizontal actuator assembly 204, and a base 206. In general terms, the receiving surface 200 is configured to receive and maintain a glass web or other substrate 207 (e.g., the glass ribbon 22 (FIG. 1), the glass sheet 24 (FIG. 1)) as described in greater detail below. The actuator assembly or assemblies 202, 204 are operable to effectuate movement of the receiving surface 200 relative to the base 206 in a pre-determined fashion. For example, and relative to the x, y, z coordinate system provided in the views, the vertical actuator assembly 202 operates to move the receiving surface 200 along the z axis; the horizontal actuator assembly 204 operates to move the receiving surface 200 along the x axis. Finally, the base 206 facilitates installation of the transfer device 46 (e.g., relative to the glass sheet conveying device 42 (FIG. 1)), and supports other components of the transfer device 46.

The receiving surface 200 can be provided or formed in various manners, and in some embodiments is defined by a handling unit 208 having one or more beams, for example a first beam 210 and a second beam 212. The first and second beams 210, 212 are transversely spaced from one another (e.g., a spacing along the y axis), and are interconnected by a frame 214. A width of each of the beams 210, 212 (e.g., dimension along the y axis) and the transverse spacing can correspond with components and layout of the glass sheet conveying device 42 (FIG. 1) as described in greater detail below. In other embodiments, more or less than two of the beams 210, 212 are provided. With the embodiment of FIGS. 7A-7C, the receiving surface 200 is collectively defined by an uppermost face 216 of each of the first and second beams 210, 212. At least the uppermost face 216 of each of the beams 210, 212 is formatted to contact and slidably interface with glass in a manner that minimizes possible defects being formed in the glass (e.g., the uppermost face of each of the beams 210, 212 can be highly smooth or flat, can be coated with a low coefficient of friction material, etc.).

Figure 8A:
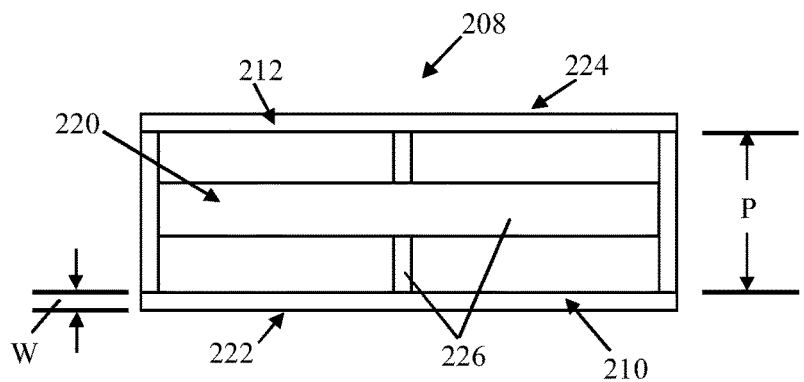
FIG. 8A is a simplified top plan view of handling unit useful with the transfer device of FIG. 7A.
Figure 8B:
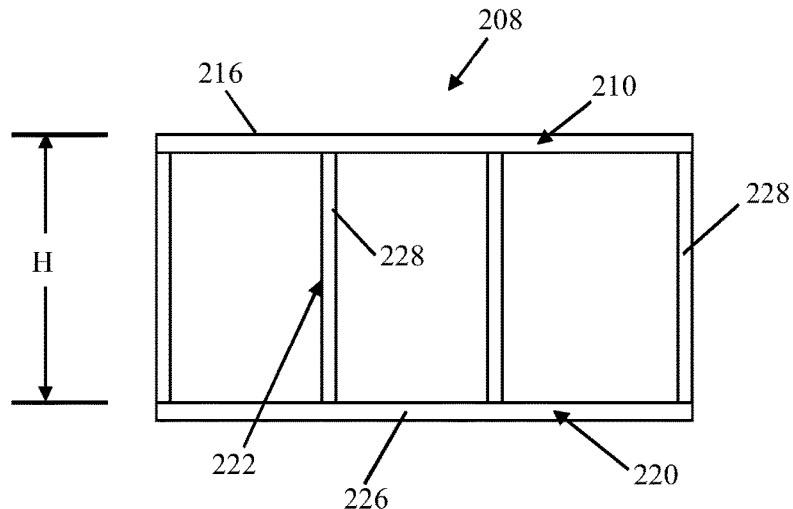
FIG. 8B is a simplified side view of the handling unit of FIG. 8A.
Figure 8C:
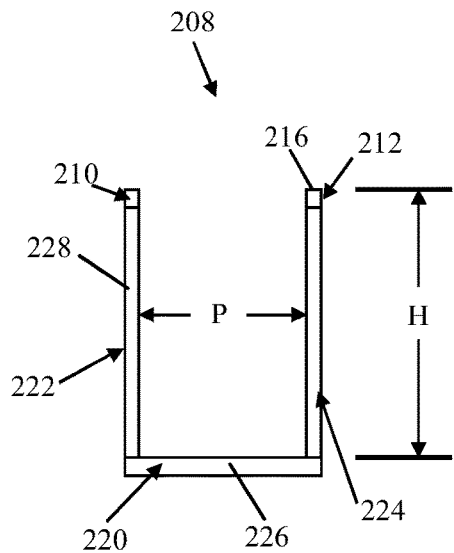
FIG. 8C is a simplified end view of the handling unit of FIG. 8A.

Some optional dimensional attributes of the handling unit 208 are better understood with reference to the simplified views of FIGS. 8A-8C. The frame 214 can be viewed as including or forming a floor 220, and opposing, first and second sides 222, 224. The floor 220 can be defined by one or more bars 226. The opposing sides 222, 224 are defined at opposite sides of the floor 220, respectively, and can each include a plurality of spaced apart pillars 228 projecting from the floor 220. In other embodiments, and as described in greater detail below, one or both of the sides 222, 224 can have a more solid construction. With the non-limiting embodiment of FIGS. 8A-8C, the first beam 210 is attached to and supported by the pillars 228 of the first side 222 opposite the floor 220; the second beam 212 is attached to and supported by the pillars 228 of the second side 224 opposite the floor 220. With these structural features in mind, the view FIG. 8A identifies a width W for the first beam 210. The second beam 212 can have a substantially identical (i.e., within 10% of truly identical) width. Moreover, the side 222, 224 supporting the corresponding beam 210, 212 (e.g., the pillars 228 comprising the side 222, 224) can also have a width commensurate with the width W identified in FIG. 8A. In some embodiments, the beams 210, 212 are each substantially linear (i.e., within 10% of a truly linear shape) and are substantially parallel (i.e., within 10% of a truly parallel relationship). With these and similar constructions, a uniform spacing P is defined between the beams 210, 212 as identified in FIG. 8A and corresponds with the transverse spacing (y axis in FIGS. 7A and 7B) mentioned above. The spacing P can further be defined the opposing sides 222, 224 as identified in FIG. 8C. Finally, with reference to FIGS. 8B and 8C, a geometry of the handling unit 208 can define a clearance height H as a linear distance between a top face of the floor 220 and the uppermost face 216 of each of the beams 210, 212.

Figure 9A:
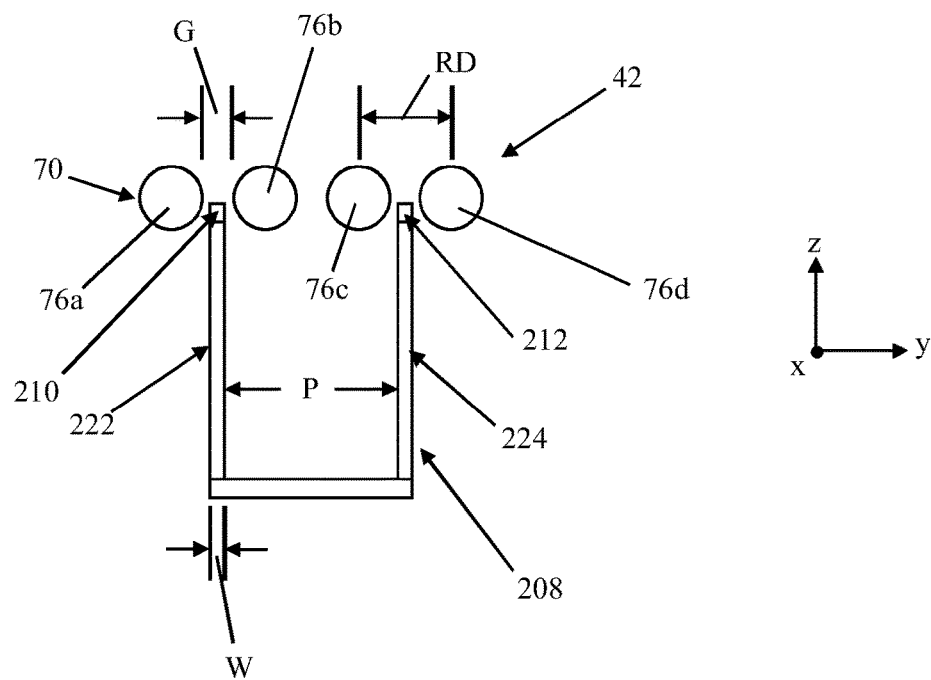
FIG. 9A is a simplified end view of the handling unit of FIG. 8A relative to a portion of the glass sheet conveying device of the system of FIG. 1 in a first stage of operation.

In some embodiments, one or more of the dimensional or geometry features of the handling unit 208 as described above can be selected in accordance with one or more other components of the system 20 (FIG. 1). For example, FIG. 9A is a simplified representation of the handling unit 208 relative to a portion of the glass sheet conveying device 42. Once again, the upstream section 70 of the glass sheet conveying device 42 can include the plurality of rollers 76. As with conventional conveyor configurations, immediately adjacent or consecutive ones of the rollers 76 are separated from one another by a gap G (e.g., the gap G identified in FIG. 9A between the pair of immediately adjacent, first and second rollers 76a, 76c). Other immediately adjacent pairs of the rollers 76 can establish the same or a similarly sized gap. Regardless, upon final assembly of the system 20 (FIG. 1), the handling unit 208 can be arranged relative to the upstream section 70 such that the first beam 210 is vertically aligned (z axis) with a first one of the gaps G (i.e., in the view of FIG. 9A, the first beam 210 is vertically aligned with the gap G between the first and second rollers 76a, 76c), and the second beam 212 is vertically aligned with a second one of the gaps G (the gap between second and third rollers 76c, 76d in FIG. 9A). The width W of each of the first and second beams 210, 212 (and optionally of the corresponding sides 222, 224) is selected to be less than a size of the corresponding gap G. Or, conversely stated, the upstream section 70 of the glass sheet conveying device 42 can be constructed such that the gap G otherwise vertically aligned with the respective beams 210, 212 has a size that is greater than the width W of the corresponding beam 210, 212 (and optionally of the corresponding side 222, 224). With this construction, each of the beams 210, 212 and corresponding side 222, 224 can readily vertically slide (along the z axis) within the gap G with which the beam 210, 212 is vertically aligned (e.g., the first beam 210 and first side 222 can readily slide in the vertical direction between the first and second rollers 76a, 76c). With some embodiments in which the upstream section 70 of the glass sheet conveying device 42 is provided as a conventional roller conveyor having uniformly sized rollers 76 arranged at a uniform, pre-determined gap size between immediately adjacent ones of the rollers 76, other dimensions of the handling unit 208 can be designed to better ensure vertical alignment of the beams 210, 212 with the respective ones of the gaps G. For example, the uniformly-arranged rollers 76 can have an established center-to-center roller distance RD between immediately adjacent ones of the rollers 76 (e.g., the roller distance RD identified for the rollers 76c, 76d in FIG. 9A). The spacing P between the beams 210, 212 can correspond to the roller distance RD, for example as the distance RD multiplied by an integer (e.g., with the one arrangement of FIG. 9A, the spacing P is 2RD). Other dimension or geometries are also acceptable.

Figure 9B:
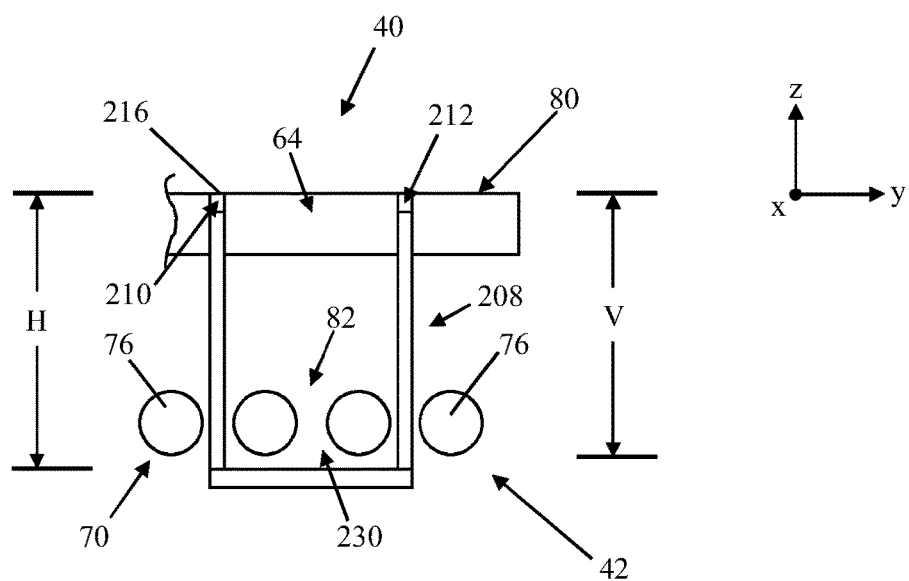
FIG. 9B is a simplified end view of the handling unit of FIG. 8A relative to a portion of the glass sheet conveying device and a portion of the glass ribbon conveying device of the system of FIG. 1 in a second stage of operation.

FIG. 9B illustrates the handling unit 208 in a vertically raised position relative the rollers 76 of the glass sheet conveying device 42 (i.e., the handling unit 208 has moved upwardly along the z axis relative to the orientation of FIG. 9A). FIG. 9B further illustrates, in simplified form, a portion of the glass ribbon conveying device 40, and in particular the roller 64 at the downstream end 60 (FIG. 3A) of the glass ribbon conveying device 40. It will be recalled that with some constructions of the system 20 (FIG. 1), the ribbon support face 80 (referenced generally) of the glass ribbon conveying device 40 at the downstream end 60 is vertically above the sheet support face 82 (referenced generally) of the glass sheet conveying device 42 at least at the upstream section 70 thereof. The rollers 76 of the upstream section 70 can be viewed as collectively defining a bottom face 230 (referenced generally) opposite the sheet support face 82. For reasons made clear below, the transfer device 46 (FIG. 7A) can operate to selectively raise and lower (i.e., in a direction of the z axis) the handling unit 208 between a position in which the uppermost face 216 of the beams 210, 212 is aligned with the ribbon support face 80 (i.e., the orientation of FIG. 9B) and a position in which the uppermost face 216 of the beams 210, 212 is below the sheet support face 82 (i.e., akin to the orientation of FIG. 9A). To accommodate this range of motion, the clearance height H is selected to be equal to or greater than the vertical distance V between the plane of the ribbon support face 80 and a plane of a bottom face 230 collectively defined by the rollers 76 of the glass sheet conveying device 42. With this optional configuration, the handling unit 208 is readily transitioned between the desired raised and lowered positions. Other dimensions or geometries are also envisioned.

Figure 10:
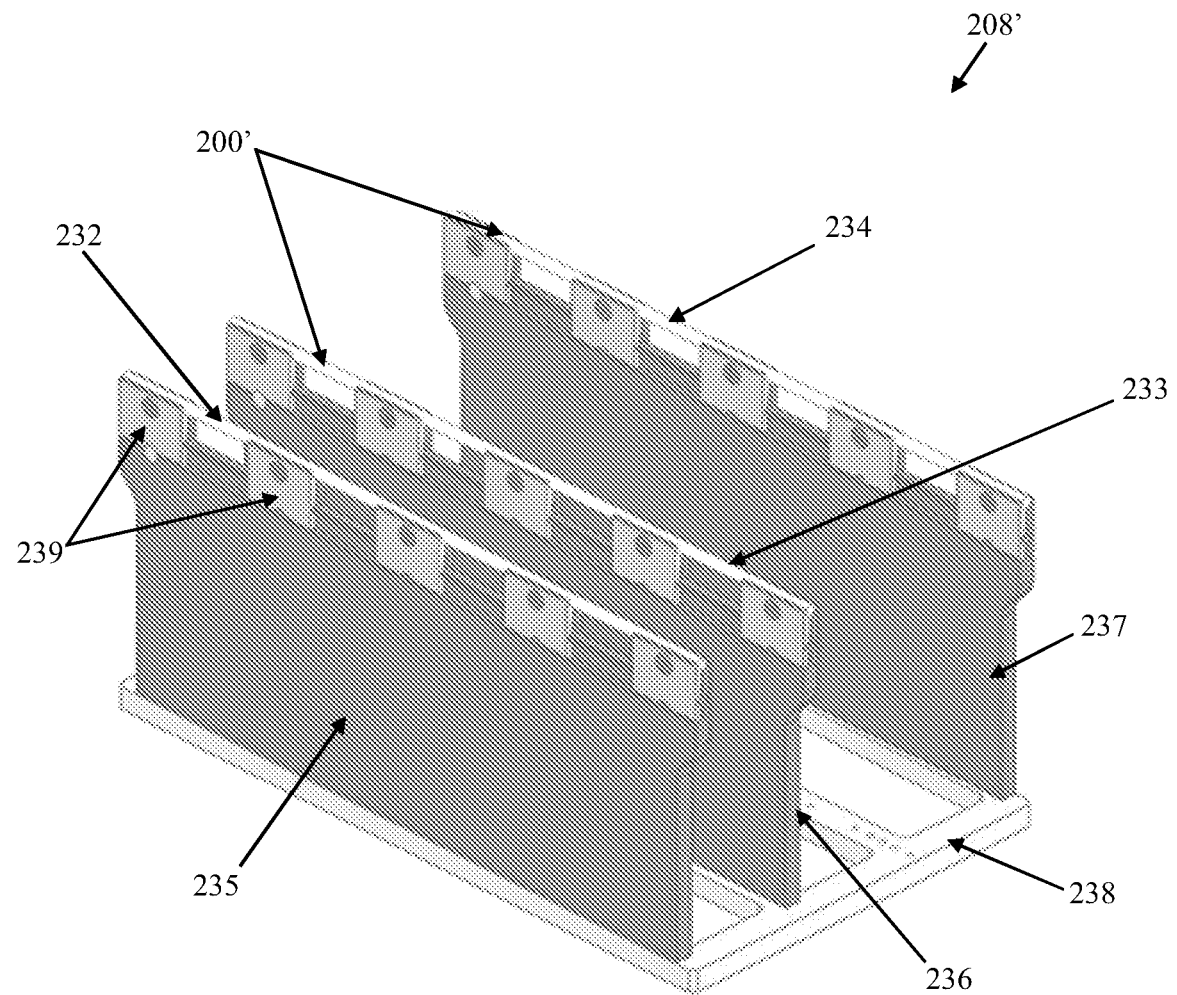
FIG. 10 is a perspective view of another handling unit in accordance with principles of the present disclosure and useful with the transfer device of FIG. 7A.

The handling unit 208 can assume a wide variety of other forms appropriate for the operations described above and elsewhere below. For example, another handling unit 208' in accordance with principles of the present disclosure is shown in FIG. 10. The handling unit 208' provides a receiving surface 200' (referenced generally) that is collectively defined by first, second and third beams 232, 233, 234. Each of the beams 232, 233, 234 is carried by a corresponding side panel 235, 236, 237 that in turn is connected to and project upwardly (relative to the orientation of FIG. 10) from a floor 238. The beams 232, 233, 234 can be akin to a cylindrical rod in some embodiments, formed of a material appropriate for sliding interface with glass. In some embodiments, a selective attachment is provided between the beam 232, 233, 234 and the corresponding side panel 235, 236, 237. For example, and as identified for the first beam 233/first side panel 235, mounting clips 239 can be attached to the side panel 235 and configured to selectively engage and maintain the beam 232 at a known spatial location. In particular, the clips 239 can be configured and arranged relative to the side panel 235 such that upon final assembly of the side panel 235 to the floor 238, the beam 232 is at a pre-determined distance from the floor 238 and is substantially parallel to a major plane of the floor 238 for the reasons described above with respect to FIGS. 8A-8C and 9A-9B. Further, as the beam 232 wears over time, the mounting clips 239 facilitate replacement with a new beam. In some embodiments, one or more of the side panels 235, 236, 237 can have the solid construction shown. Further, the floor 238 can be configured to facilitate releasable mounting of the side panels 235, 236, 237 at pre-determined or known locations relative to one another and commensurate with the spacing P and roller distance RD (FIG. 9A) relationships described above. Thus, while the handling unit 208' is shown as including three of the side panels 235, 236, 237, and additional side panel can be added, or one of the side panels 235, 236, 237 can be removed as desired.

Returning to FIGS. 7A-7C, in addition to providing the geometries described above, the frame 214 facilitates connection (indirect connection or direct connection) of the receiving surface 200 to the base 206. For example, in some embodiments, the transfer device 46 can include a horizontal carriage assembly 240 slidably connected to a horizontal track 242 that in turn is mounted to the base 206. A vertical track 244 can be attached to or formed by the horizontal carriage assembly 240. With this in mind, the frame 214 can be attached to or form a vertical carriage assembly 246 that is slidably connected to vertical track 244. In general terms, the sliding relationship of the vertical carriage assembly 246 relative to the vertical track 244 facilitates movement of the receiving surface 200 relative to the base 206 along the z axis (vertical direction); the sliding relationship of the horizontal carriage assembly 240 relative to the horizontal track 242 facilitates movement of the receiving surface 200 relative to the base 206 along the x axis (horizontal direction). Alternatively, other components, mechanisms, etc., can be employed for connecting the receiving surface 200 with the base 206, in a manner facilitating movements along the x and z axes, that may or may not include the frame 214, one or both of the carriage assemblies 240, 246, and/or one or both of the tracks 242, 244.

Where provided, the horizontal carriage assembly 240 can include a carriage 250 and the vertical track 244. The carriage 250 is configured for sliding engagement with the horizontal track 242, and the horizontal carriage assembly 240 can include or carry one or more components that promote translation of the carriage 250 along the horizontal track 242 such as, for example, rollers, ball bearings, etc. The vertical track 244 is connected to (e.g., rigidly coupled to) or formed by the carriage 250. The horizontal carriage assembly 240 can optionally include one or more additional components or features that promote assembly and/or operation of the transfer device 46, such as a reinforcement plate 252. The vertical carriage assembly 246 includes a carriage 260 and a support member 262. The carriage 260 is configured for sliding engagement with the vertical track 244, and the vertical carriage assembly 246 can include or carry one or more components that promote translation of the carriage 260 along the vertical track 244 such as, for example, rollers, ball bearings, etc. The support member 262 is attached to (or formed with) the carriage 260, and is further attached to the frame 214 (or other component that maintains the receiving surface 200). While the support member 262 is illustrated as having an open configuration (e.g., the support member 262 as shown has a central opening or hole), in other embodiments the support member 262 can be a continuous, solid body.

The vertical actuator assembly 202 is configured to dictate a position of the vertical carriage assembly 246 relative to, and drive the carriage 260 along, the vertical track 244. Thus, the vertical actuator assembly 202 is connected to the carriage 260 and can assume various forms apparent to one of skill (e.g., servo motor-based). In some embodiments, the vertical actuator assembly 202 includes, or is electronically connected to, a controller, such as the controller 54 of FIG. 1, akin to or including a computing device, such as a PLC, HMI, etc. Similarly, the horizontal actuator assembly 204 is configured to dictate a position of the horizontal carriage assembly 240 relative to, and drive the carriage 250 along, the horizontal track 242. Thus, the horizontal actuator assembly 204 is connected to the carriage 250 and can assume various forms apparent to one of skill (e.g., servo motor-based). In some embodiments, the horizontal actuator assembly 204 includes, or is electronically connected to, a controller, such as the controller 54 of FIG. 1, akin to or including a computing device, such as a PLC, HMI, etc. Operation of the actuator assemblies 202, 204, for example as dictated by program(s) operated upon by the controller(s) otherwise prompting operation of the actuator assemblies 202, 204, can be coordinated or synchronized with other automated operations being performed by the system 20 (FIG. 1) as described in greater detail below.

The base 206 can assume various forms appropriate for robustly supporting other components of the transfer device 46 at a fixed elevation. For example, the base 206 can have the table-like construction as shown, although other configurations are equally acceptable.

Other Optional System 20 Components

Figure 11:
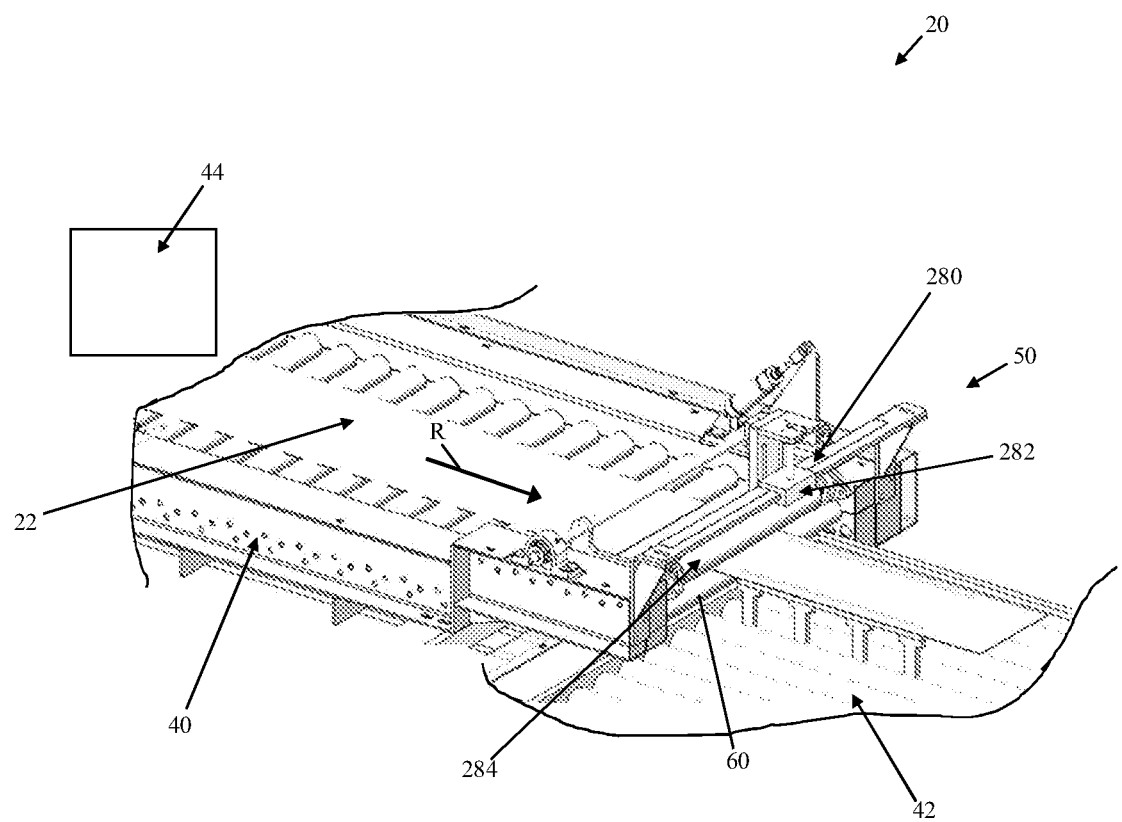
FIG. 11 is an enlarged perspective view of a portion of the system of FIG. 1, including a separation initiation device.

Returning to FIG. 1, the system 20 can optionally include the separation initiation device 50. The separation initiation device 50 can assume various forms, and can be configured to facilitate crack propagation along the score line imparted into the glass ribbon 22. In some embodiments, and as best shown in FIG. 11, the separation initiation device 50 includes a nozzle assembly 280 (referenced generally) connected to a source (not shown) of pressurized gas (e.g., air), and arranged to direct a burst or "puff" of pressurized gas onto the glass ribbon 22. A nozzle 282 provided with the nozzle assembly 280 can have an elongated construction as shown, or a one or more focused nozzles can be provided. Regardless, the nozzle assembly 280 is operably associated with (e.g., mounted to) the glass ribbon conveying device 40 downstream of the glass scoring device 44 (shown in block form in FIG. 11), for example at or immediately adjacent the downstream end 60. The separation initiation device 50 can further include one or more additional, optional components, such as a controller (e.g., the controller 54 of FIG. 1, a computer-like device such as a PLC, a HMI, etc.) programmed to prompt the supply of pressurized gas to the nozzle assembly 280 at times synchronized with other operations being performed by the system 20 as described below. One or more hold down rollers (e.g., the roller 284) are also optionally included with the separation initiation device 50. In other embodiments, the separation initiation device 50 can incorporate other formats conventionally employed for facilitating separation of scored glass. In yet other embodiments, the separation initiation device 50 can be omitted.

With specific reference to FIG. 1, the optional lead-in device 52 can assume various forms and in some embodiments is or includes lehr (e.g., elongated, temperature-controlled kiln) as conventionally employed with the manufacture of glass, and in particular in annealing a molten glass ribbon. In some embodiments, a conveyor is provided with the lehr, conveying glass ribbon received from a supply (e.g., a fusion draw system); the conveyor of the lehr 52 can be a continuation of the conveyor provided with the glass ribbon conveying device 40 such that the lehr 52 can be considered a component of the glass ribbon conveying device 40. In other embodiments, the conveyor provided with the lehr 52 can be considered as distinct from the conveyor of the glass ribbon conveying device 40. Regardless, where the optional lead-in device 52 is or includes a lehr and receives a continuous supply of molten glass ribbon, the glass ribbon exiting the lead-in device 52 may have an elevated temperature (e.g., on the order of 500-550° C.), with remaining components of the system 20 being adapted for long term operation under these high temperature conditions. As mentioned above, the supply of glass ribbon as provided to the glass ribbon conveying device 40 can be generated in other fashions and the present disclosure is not limited to a fusion draw system. In these and other embodiments, a lehr may or may not be desired; thus, in some embodiments, the lead-in device 52 is omitted.

The system 20 can include additional components that may or may not be implicated by the drawings. For example, various hold down rollers, edge guides, etc., can be provided at various locations, such as along the glass ribbon conveying device 40, the glass sheet conveying device 42, the glass scoring device 44, etc.

Methods of Operation

Figure 12A:
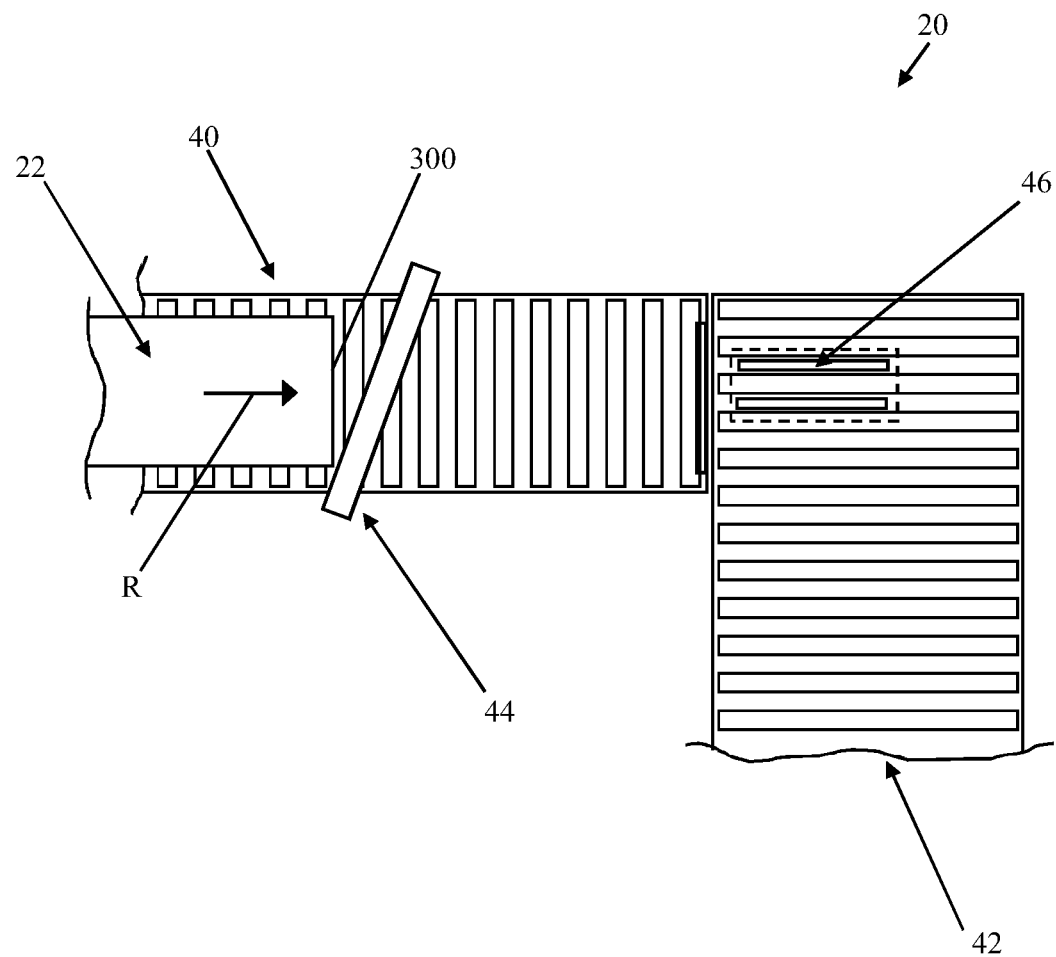
FIGS. 12A-12C are simplified top plan views of a portion of the system of FIG. 1 processing a glass ribbon and illustrating steps of methods in accordance with principles of the present disclosure including conveying a glass ribbon and imparting a score line.
Figure 12B:
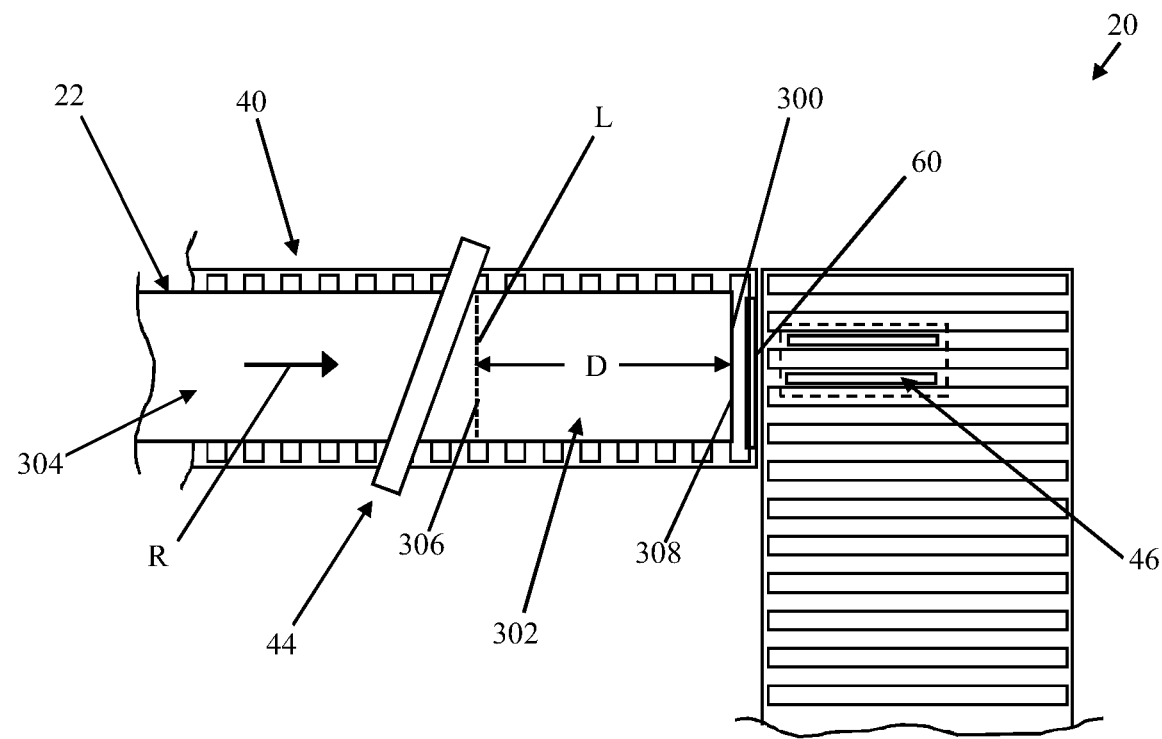

Methods of the present disclosure, as facilitated, for example, by operation of the system 20 can be understood with reference to FIG. 1 and the simplified representations described below. With initial reference to FIG. 12A, the continuous glass ribbon 22 is supplied to the glass ribbon conveying device 40 that in turn operates to convey the glass ribbon 22 in the ribbon travel direction R. As a point of reference, in the state of FIG. 12A, the glass ribbon 22 defines or terminates at a leading end 300. With continued conveyance of the glass ribbon 22 in the ribbon travel direction R, the leading end 300 progresses downstream of the glass scoring device 44. The glass scoring device 44 is then operated to impart the score line L as shown in FIG. 12B. Operation of the glass scoring device 44 is synchronized with a speed or rate of travel of the glass ribbon conveying device 40 to generate the score line L to be straight and perpendicular (perpendicular to opposing edges of the glass ribbon 22) as described above.

Operation of the glass scoring device 44 can be further controlled or timed relative to continuous travel of the glass ribbon 22 based upon a desired end product (glass sheet) size. As a point of reference, formation of the score line L does not completely sever the glass ribbon 22; immediately following formation of the score line L, then, the glass ribbon 22 can be characterized as defining or comprising a glass sheet intermediate 302 and a glass ribbon upstream portion 304. Because the score line L is not through an entire thickness of the glass ribbon 22, the glass sheet intermediate 302 remains physically connected to the glass ribbon upstream portion 304 at the stage of operation of FIG. 12B. The score line L defines an upstream end 306 of the glass sheet intermediate 302. With the exemplary arrangement of FIG. 12B, the leading end 300 defines the opposing, downstream end 308 of the glass sheet intermediate 302. A travel direction dimension D of the glass sheet intermediate 302 is defined as a linear distance between the opposing, upstream and downstream ends 306, 308. As described below, the glass sheet intermediate 302 will later be separated from the glass ribbon upstream portion 304 once the glass ribbon 22 has progressed to locate the score line L proximate the downstream end 60 of the glass ribbon conveying device 40, resulting in a completed glass sheet 24 (FIG. 1). Thus, the travel direction dimension D of the glass sheet intermediate 302 corresponds with a major dimension (e.g., length or width) of the resultant glass sheet 24, and can be pre-selected or pre-determined by an operator in accordance with desired end product dimensions.

Figure 12C:
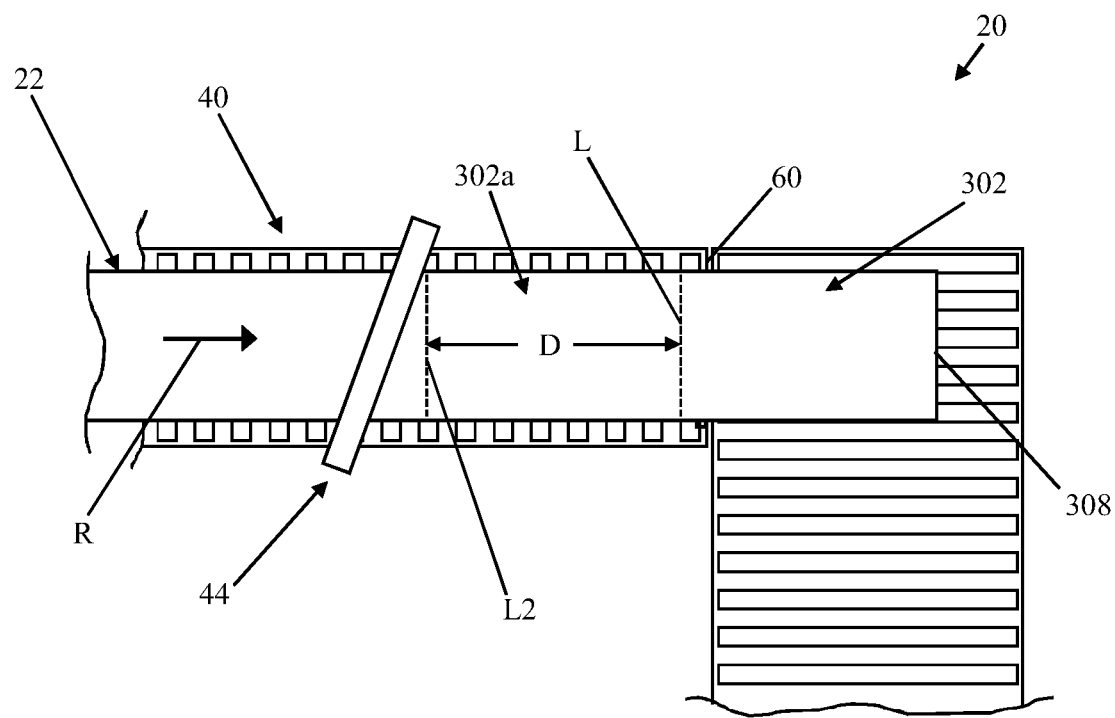
Figure 13A:
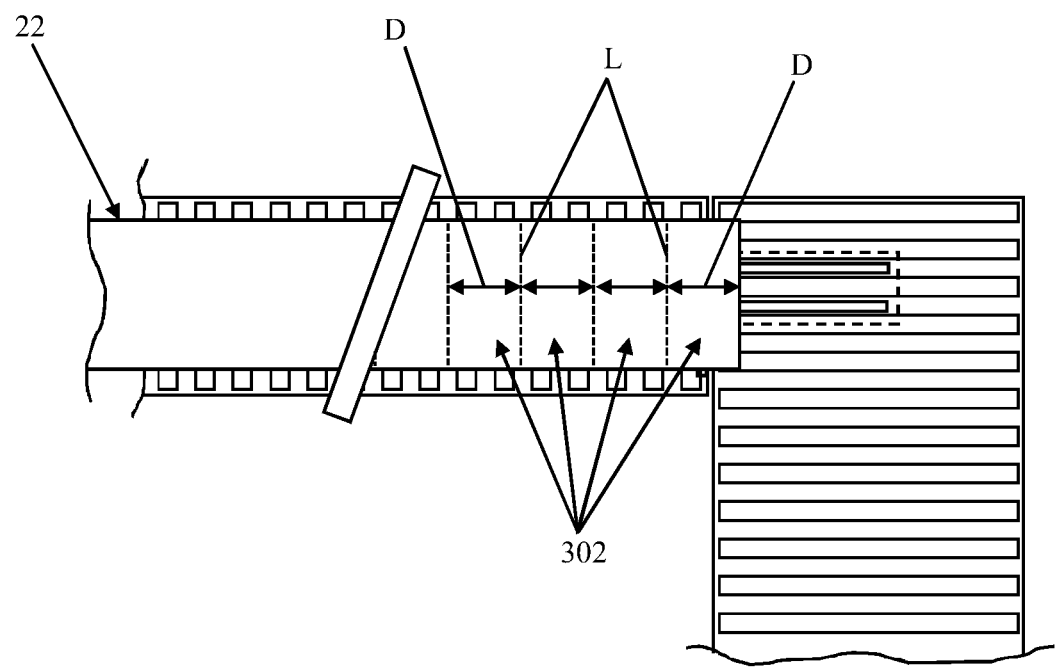
FIGS. 13A and 13B are simplified top plan views of a portion of the system of FIG. 1 processing a glass ribbon and imparting a score line at intervals differing from FIGS. 12A-12C.
Figure 13B:
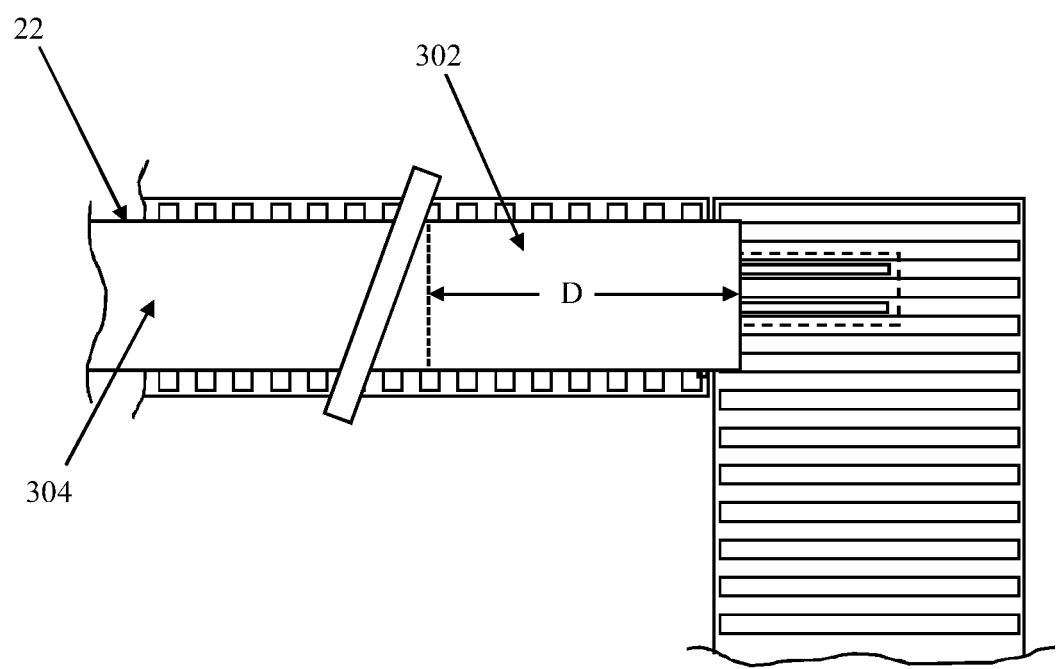

In particular, based on the selected value for the travel direction dimension D, the system 20 (e.g., one or more controllers provided therewith) functions to initiate the scoring operation once the downstream end 308 has progressed downstream of the cutting apparatus 100a (FIG. 11) provided with the glass scoring device 44 by a distance commensurate with the desired travel direction dimension D. For example, sensors (not shown) can be provided that sense features along the glass ribbon 22 indicative of the distance the downstream end 308 has progressed relative to the cutting apparatus 100a. Alternatively or in addition, the rate of travel of the glass ribbon 22 can be correlated with the desired travel direction dimension D to determine a corresponding initiation time for the scoring operation. In this regard, it will be understood that with continuous operation of the system 20 over time, depending upon the value selected for the travel direction dimension D and available surface area of the glass sheet conveying device 40 between the glass scoring device 44 and the downstream end 60 of the glass sheet conveying device 40, more than one glass sheet intermediate 302 may be defined in the glass ribbon 22 at various points in time. FIG. 12C, for example, reflects operation of the system 20 at a later point in time (as compared to FIG. 12B). As shown, the glass ribbon 22 has continued to travel in the ribbon travel direction R, with the score line L now in closer proximity to the downstream end 60 of the glass ribbon conveying device 40; however, the glass sheet intermediate 302 has not yet been separated from a remainder of the glass ribbon 22. Moreover, the glass ribbon scoring device 44 has been operated to form a second score line L2 in the glass ribbon 22 at the selected travel direction dimension D from the score line L to define a second glass sheet intermediate 302a (the score line L serves as the downstream end of the second glass sheet intermediate 302a, and the second score line L2 is the upstream end). FIG. 13A reflects that with a smaller selected travel direction dimension D, multiple, consecutive glass sheet intermediates 302 can be defined along the glass ribbon 22 via multiple individual score lines L. Conversely, FIG. 13B reflects that with a larger selected travel direction dimension D, only a single glass sheet intermediate 302 will exist at any point in time (i.e., the glass sheet intermediate 302 in FIG. 13B will be separated from the glass ribbon upstream portion 304 before the "next" score line is formed). With this explanation in mind, and returning to FIG. 12C, with some systems and methods of the present disclosure, the glass scoring device 44 is automatically prompted to perform a scoring operation at controlled intervals based upon the selected travel direction dimension D and the rate of travel of the glass ribbon 22. As an endless length of the glass ribbon 22 is continuously conveyed along the glass ribbon conveying device 40, identically sized and shaped glass sheet intermediates 302 are constantly generated in the glass ribbon 22 and delivered toward the downstream end 60 for further processing as below.

Figure 14A:
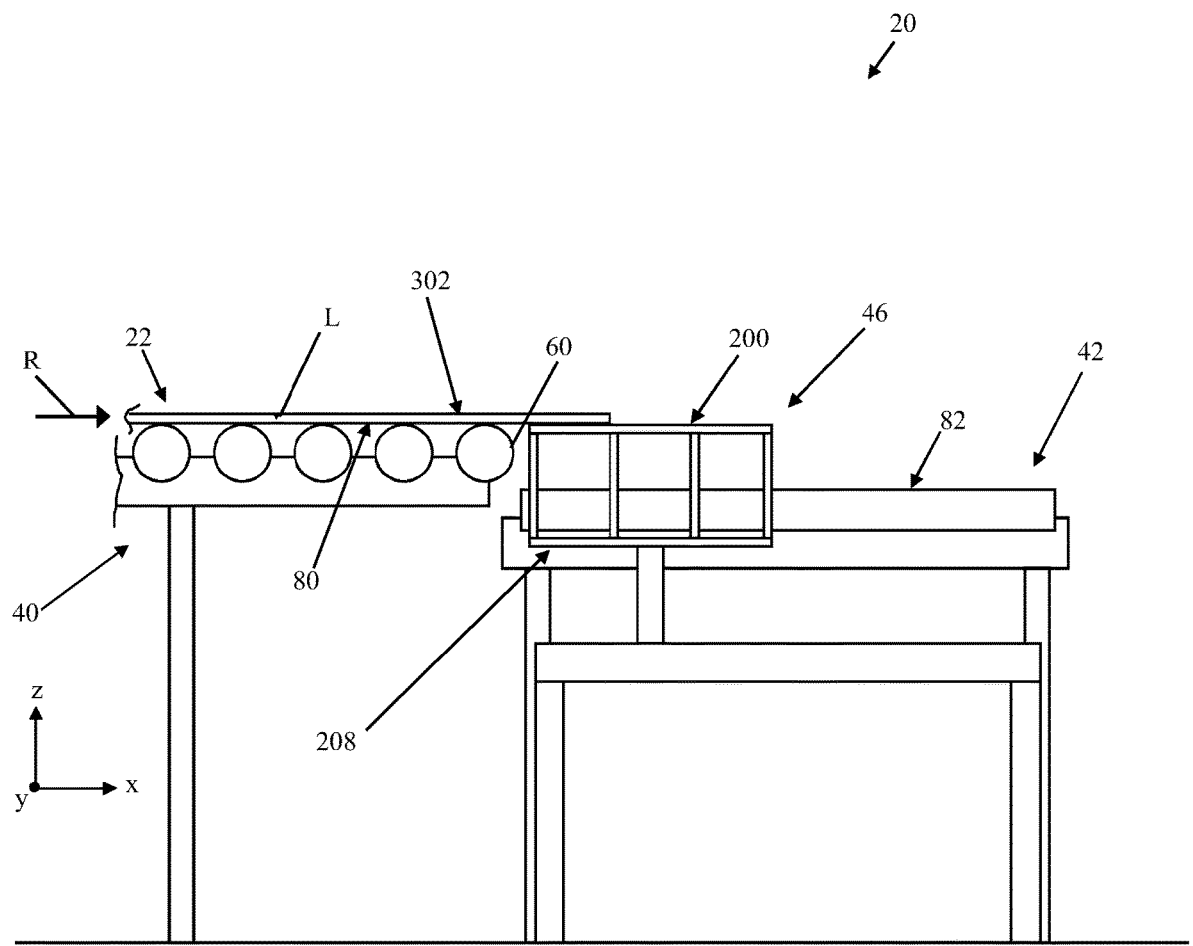
FIG. 14A is a simplified side view of a portion of the system of FIG. 1 processing a glass ribbon and illustrating a step of methods in accordance with principles of the present disclosure subsequent to the steps of FIGS. 12A-12C.
Figure 14B:
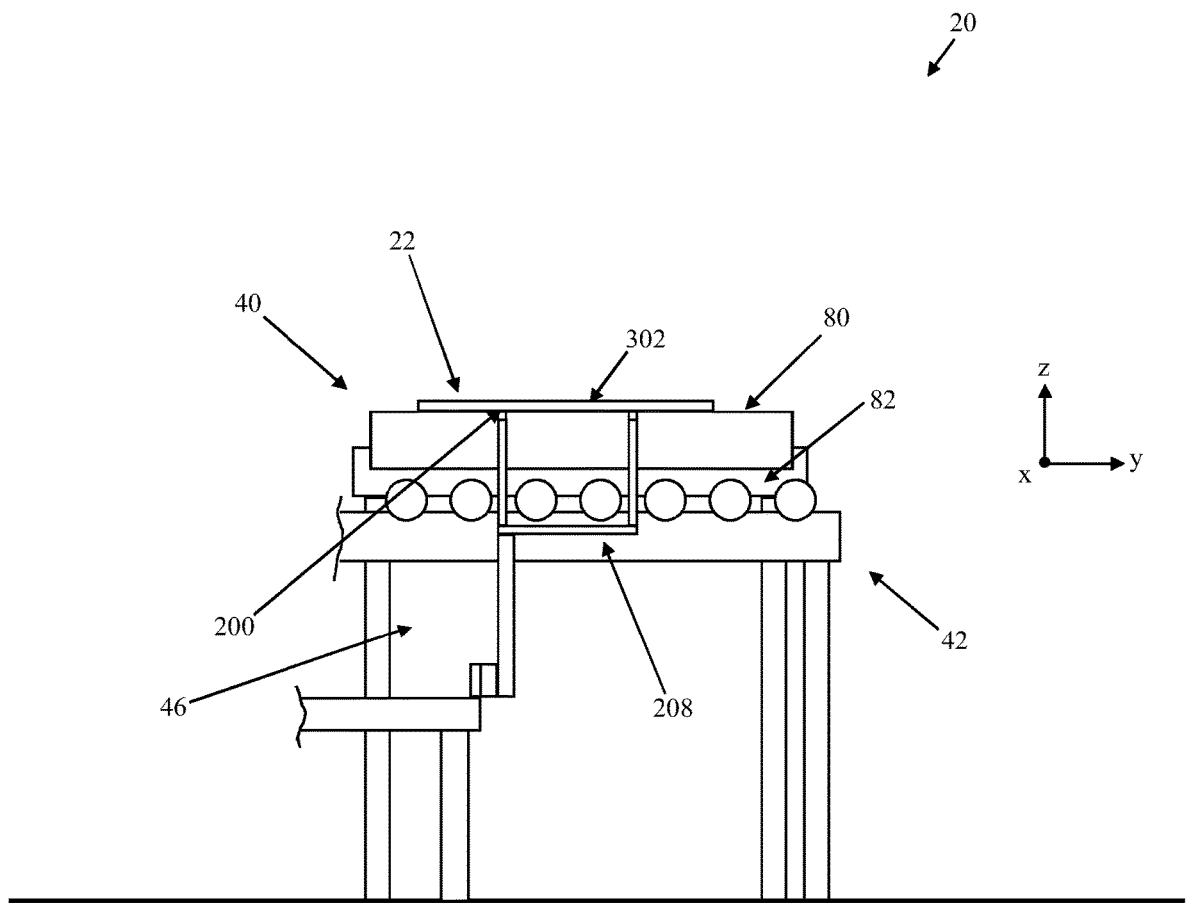
FIG. 14B is a simplified end view of the arrangement of FIG. 14A.

As can be understood by a comparison of FIGS. 12B and 12C, during and after formation of the score line L, the glass ribbon 22 continues to travel along the glass ribbon conveying device 40. As the downstream end 308 of the glass sheet intermediate 302 attains and then progresses beyond the downstream end 60 of the glass ribbon conveying device 40, the transfer device 46 (FIG. 1) can be automatically operated (or automatically prompted to operate) to receive and support the moving glass sheet intermediate 302. For example, the transfer device 46 is operated to manipulate the handling unit 208 to a first position relative to the conveying devices 40, 42 as represented in FIGS. 14A and 14B. In the first position, the receiving surface 200 (referenced generally) is raised above the sheet support face 82 (referenced generally), generally aligned with a plane of the ribbon support face 80 (as the plane of the ribbon support face 80 is defined at the downstream end 60 of the glass ribbon conveying device 40) and proximate the downstream end 60. As described above, movement of the receiving surface 200 can be facilitated, in some embodiments, by operating the vertical actuator assembly 202 (FIG. 7B) to raise the receiving surface 200 along the z axis, and by operating the horizontal actuator assembly 204 (FIG. 7A) to move the receiving surface 200 along the x axis toward the downstream end 60 of the glass ribbon conveying device 40. In the first position, the glass sheet intermediate 302 slides along and is supported by the receiving surface 200 as the glass ribbon 22 continues to travel in the ribbon travel direction R.

Figure 15A:
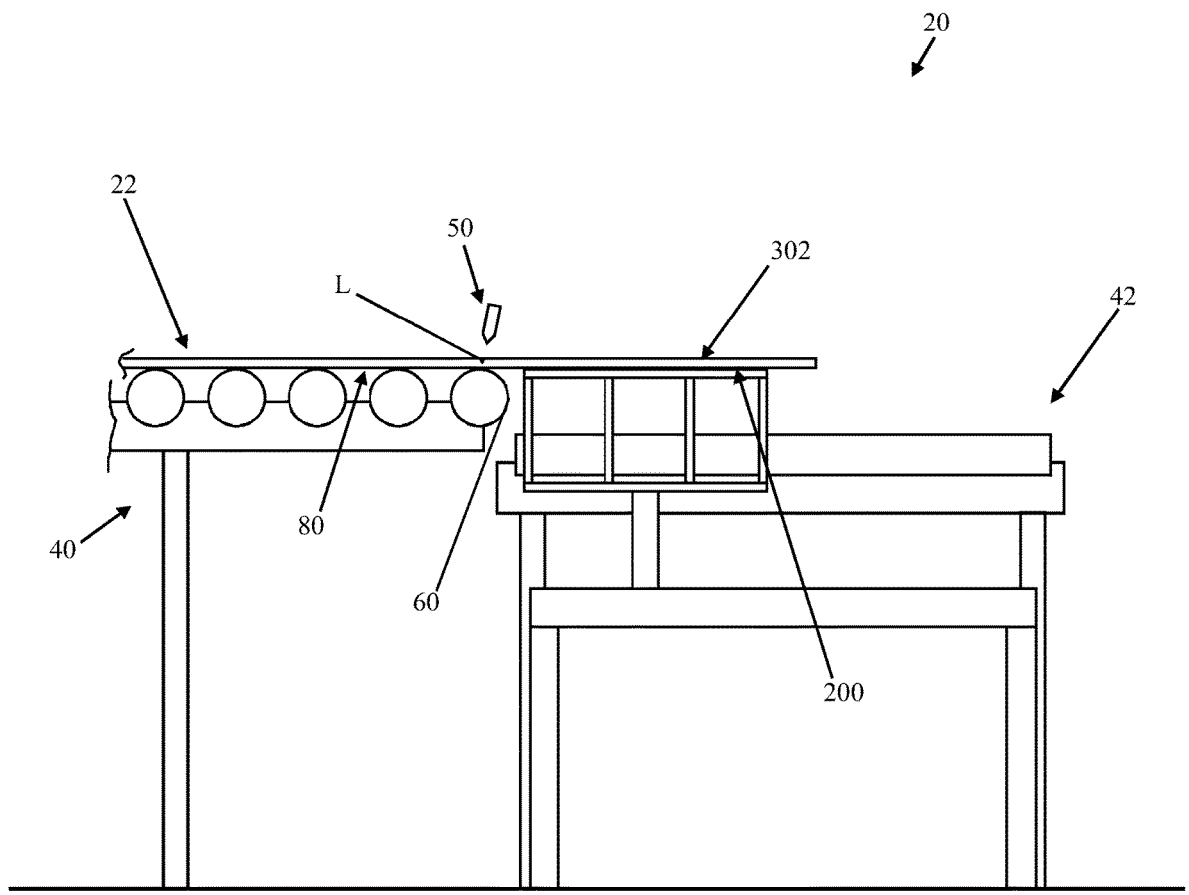
FIGS. 15A and 15B are simplified side views of a portion of the system of FIG. 1 processing a glass ribbon and illustrating steps of methods in accordance with principles of the present disclosure subsequent to the step of FIG. 14A.

With continued movement of the glass ribbon 22, the score line L approaches the downstream end 60 of the glass ribbon conveying device 40 as shown, for example, in FIG. 15A. The glass sheet intermediate 302 is separated from a remainder of the glass ribbon 22. In some embodiments, the glass sheet intermediate 302 can be slightly cantilevered to promote separation at the score line L; for example, the ribbon support face 80 (referenced generally) can form a slight angle relative to horizontal in a region of the downstream end 60 and/or a plane of the receiving surface 200 can be slightly vertically below the downstream end 60. Additionally or alternatively, the optional separation initiation device 50 (drawn schematically in FIG. 15A) can be operated to facilitate crack propagation along the score line L as described above. Thus, in some embodiments, the break/separation occurs in part by the thermal shock created by the separation initiation device 50 and in part by cantilever/gravity. Where provided, operation of the separation initiation device 50 can be synchronized or coordinated with other components of the system 20. For example, the separation initiation device 50 can be prompted to operate based upon the rate of travel of the glass ribbon 22 along the glass ribbon conveying device 40 and cycle timing of the glass scoring device 44 (FIG. 1) (e.g., where the rate of travel is known or sensed, the separation initiation device 50 can be prompted to operate at a pre-determined time interval following operation of the glass scoring device 44 that corresponds to the glass ribbon 22 having progressed the score line L to the separation initiation device 50).

Figure 15B:
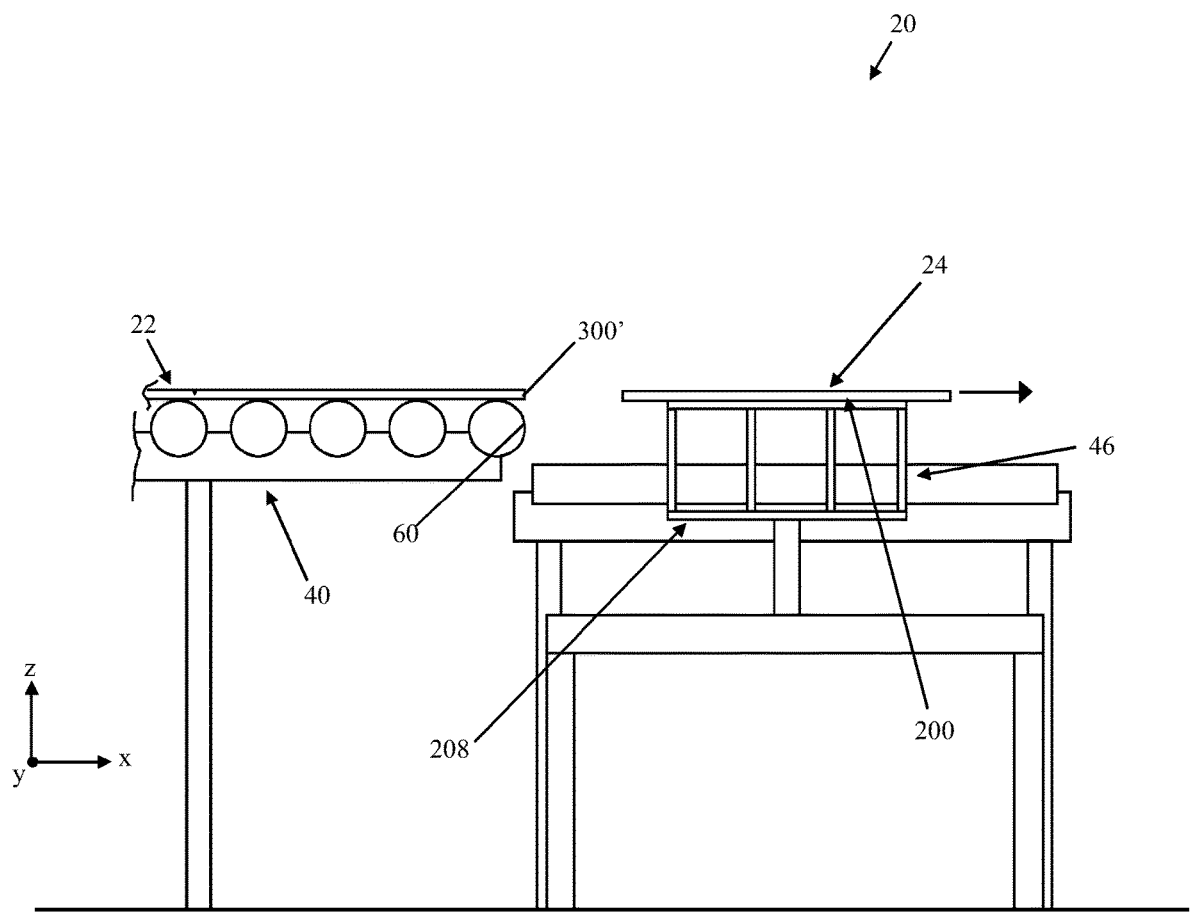

Upon being separated from a remainder of the glass ribbon 22, the glass sheet intermediate 302 is converted to the final or completed glass sheet 24 as shown in FIG. 15B. The glass sheet 24 is supported by the receiving surface 200. Immediately following separation, the transfer device 46 is operated to accelerate the glass sheet 24 away from the glass ribbon 22. For example, the horizontal actuator assembly 204 (FIG. 7A) can be prompted to move the handling unit 208, and thus the receiving surface 200 and the glass sheet 24 carried thereon, along the x axis away from the downstream end 60 of the glass ribbon conveying device 40 (e.g., in a direction of an arrow in FIG. 15B) to a second position. By accelerating the glass sheet 24 away from the glass ribbon 22 to a velocity or rate of travel that is greater than the rate of travel of the glass ribbon 22, the glass sheet 24 will be distinctly separated or spaced from the leading end 300' of the glass ribbon 22 (it being understood that the leading end 300' exists upon separation of the glass sheet 24). In some embodiments, operation of the transfer device 46 in moving from the first position (FIG. 15A) to the second position (FIG. 15B) can be synchronized or coordinated with other components of the system 20. For example, the transfer device 46 can be automatically prompted to accelerated the handling unit 208 from the first position to the second position immediately following operation of the separation initiation device 50; the selected speed or acceleration from the first position to the second position can be based on (i.e., greater than) a known rate of travel of the glass ribbon 22 along the glass ribbon conveying device 40.

Figure 16A:
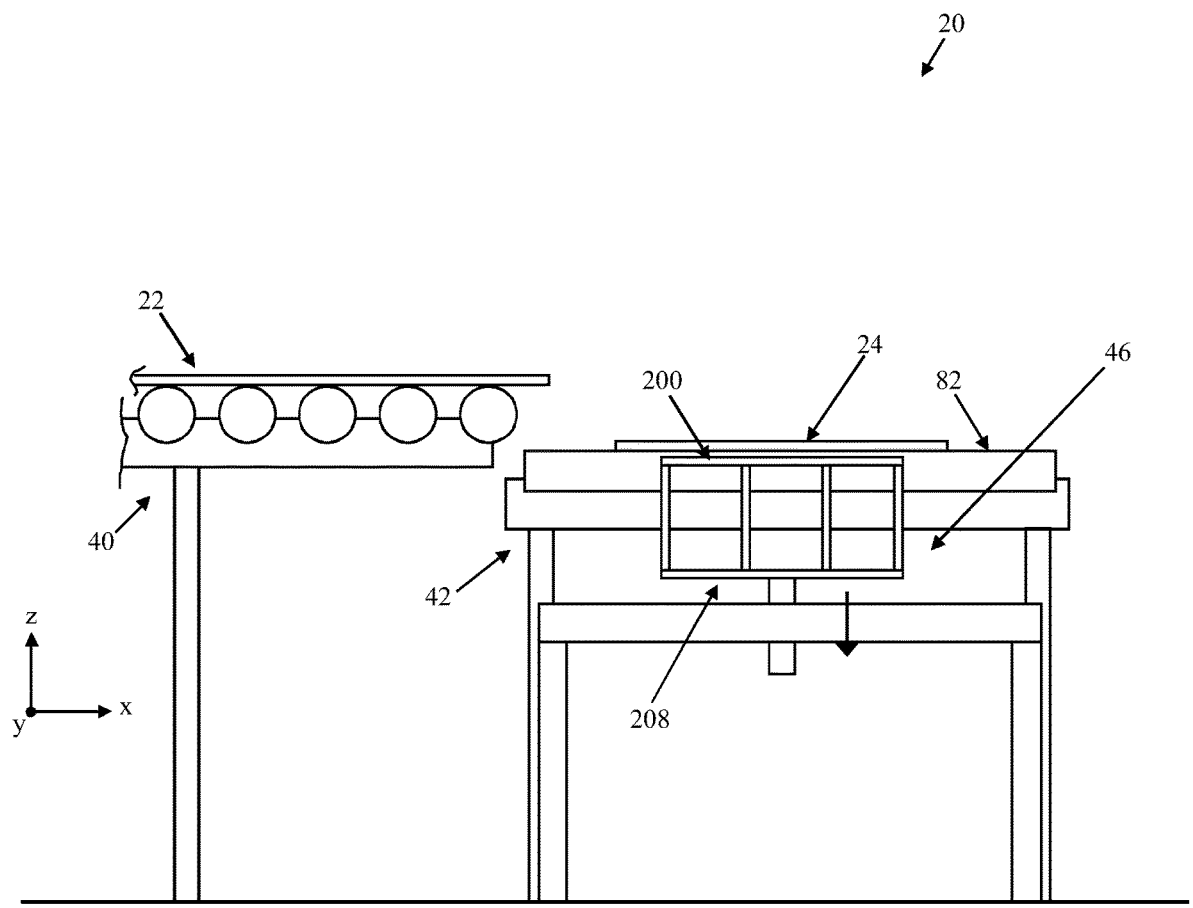
FIG. 16A is a simplified side view of a portion of the system of FIG. 1 processing a glass ribbon and illustrating a step of methods in accordance with principles of the present disclosure subsequent to the step of FIG. 15B.
Figure 16B:
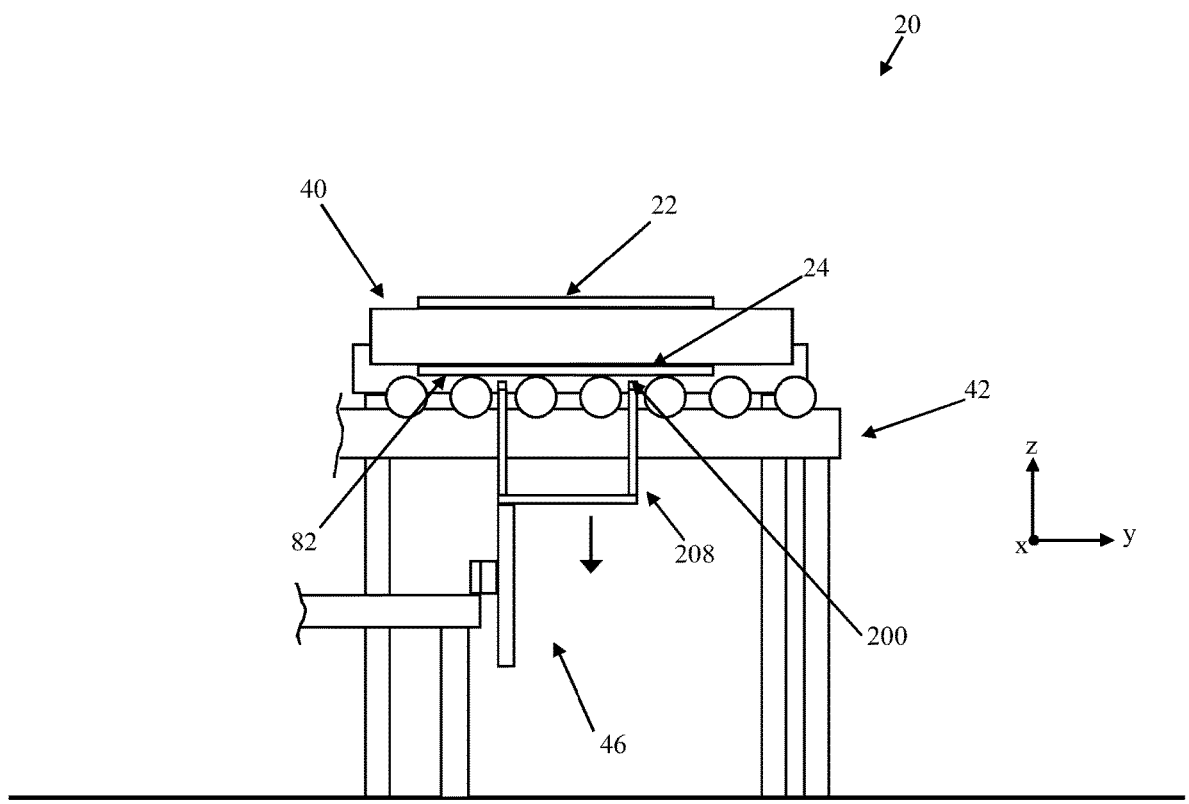
FIG. 16B is a simplified end view of the arrangement of FIG. 16A.

Once the handling unit 208 (and thus the glass sheet 24) has attained the second position, the transfer device 46 can be operated to move the receiving surface 200 (e.g., move the handling unit 208) to a third position represented in FIGS. 16A and 16B in which the glass sheet 24 is placed onto the sheet support face 82 (referenced generally) of the glass sheet conveying device 42. In the third position, the receiving surface 200 is lowered below the sheet support face 82. For example, the vertical actuator assembly 202 (FIG. 7B) can be prompted to move the handling unit 208, and thus the receiving surface 200 and the glass sheet 24 carried thereon, along the z axis vertically downwardly (e.g., in a direction of an arrow in FIGS. 16A and 16B) from the second position to the third position. In the third position, the glass sheet 24 is no longer in contact with the receiving surface 200 and instead is supported solely by glass sheet conveying device 42. As a point of reference, a comparison of FIGS. 15B and 16A reveals that the glass ribbon 22 continues to travel as the glass sheet 24 is lowered onto the sheet support face 82.

Figure 17:
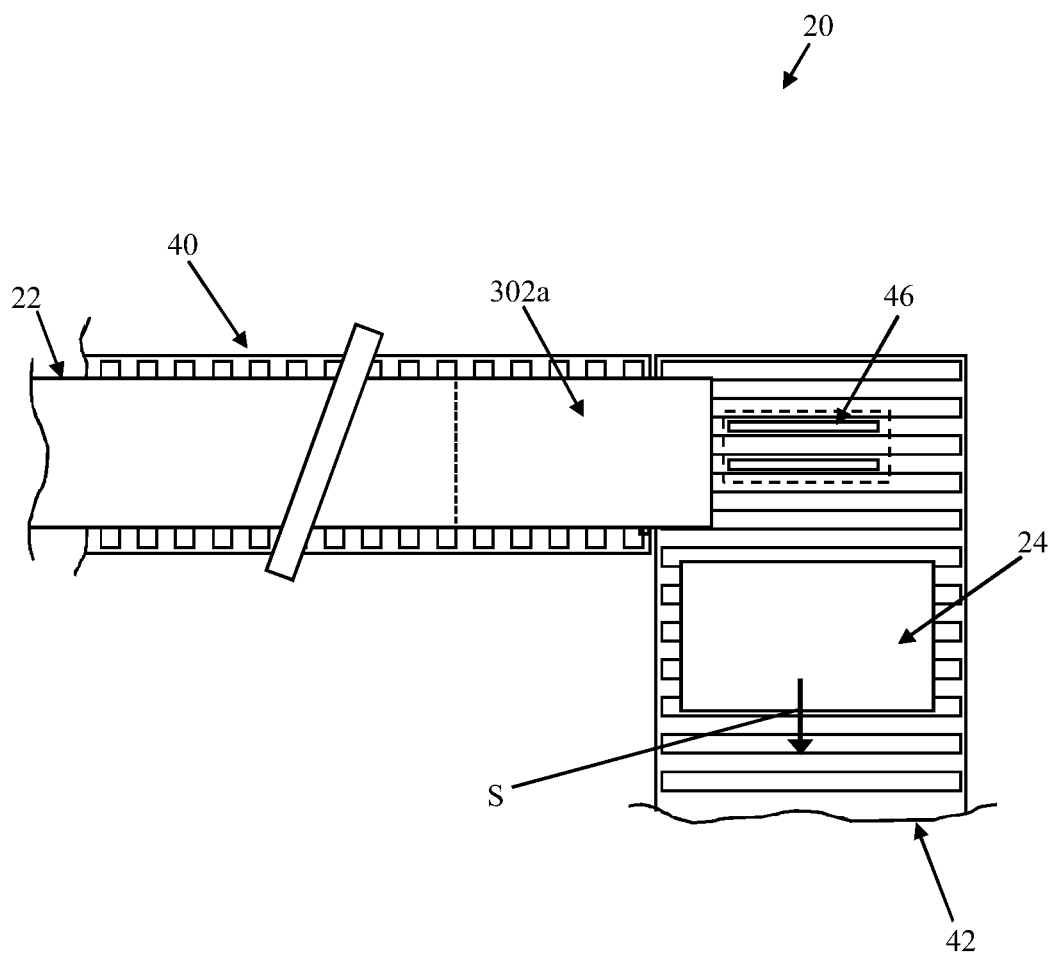
FIG. 17 is a simplified top plan view of a portion of the system of FIG. 1 processing a glass ribbon and illustrating a step of methods in accordance with principles of the present disclosure subsequent to the step of FIG. 16A.

Once the glass sheet 24 is placed or loaded onto the sheet support face 82, the glass sheet conveying device 42 operates to convey the glass sheet 24 in the sheet travel direction S and away from the glass ribbon conveying device 40 as represented by FIG. 17. The transfer device 46 is then operated to return the receiving surface 200 to the first position (FIGS. 14A and 14B), and the handling steps described above repeated for the immediately next glass sheet intermediate 302a.

In summary, some methods of the present disclosure provide for automated, sequential processing of a continuous glass ribbon by conveying the glass ribbon in a first direction along a first conveyor, forming a score line in the glass ribbon, separating a glass sheet from the glass ribbon at the score line while supporting the glass sheet with a transfer device, lowering the glass sheet onto a second conveyor, and conveying the glass sheet in a second direction along the second conveyor. With some of the systems and methods of the present disclosure, various operational steps or components occur in a synchronized or coordinated fashion. One or more controllers (e.g., the controller 54 of FIG. 1, akin to or including a computing device having a memory and a processor operating on hardware or software) can be included with the systems of the present disclosure to effectuate one or more of the synchronized operations based on algorithms, operator input, sensed operational parameters, etc.

The glass ribbon processing systems and methods of the present disclosure provide a marked improvement over previous designs and techniques. By transferring a glass sheet formed from the glass ribbon to a conveyor that conveys the glass sheet in a direction differing from a travel direction of the glass ribbon (e.g., a 90 degree turn) immediately after glass sheet separation, the systems and method of the present disclosure are highly conducive to streamlined production of glass sheets utilizing a unique production floor footprint and arrangement not otherwise available with conventional in-line designs. In some non-limiting embodiments, the systems and methods of the present disclosure can successfully separate thin glass ribbon (e.g., 0.7-4 mm; alternatively less than 0.7 mm such as 0.4 mm, 0.3 mm, 0.2 mm, etc.) at a temperature on the order of 500-550° C. into glass sheets and convey the so-formed sheets for subsequent processing. The systems and methods of the present disclosure can allow for operator selection of different glass sheet dimensions from a glass ribbon, for example a length on the order of 220-700 mm and either a narrow width (e.g., on the order of 80-120 mm) or a wide width (e.g., on the order of 220-700 mm) in some non-limiting embodiments. Other optional features can include provision of a glass scoring device able to sustain greater heater as compared to conventional designs, quick changeover or replacement of a cutting apparatus provided with the glass scoring device, provision of a "floating" cutting member with the cutting apparatus, etc. Also, in some embodiments, all equipment or devices of the system are automated by PLC and HMI with the ability to track process data, and optionally capable of supporting data acquisition.

Various modifications and variations can be made the embodiments described herein without departing from the scope of the claimed subject matter. Thus it is intended that the specification cover the modifications and variations of the various embodiments described herein provided such modifications and variations come within the scope of the appended claims and their equivalents.

What is claimed is:

1. A system for processing a glass ribbon, the system comprising:
    a glass ribbon conveying device comprising an upstream end opposite a downstream end, wherein the glass ribbon conveying device establishes a ribbon travel direction from the upstream end to the downstream end;
    a glass scoring device operatively associated with the glass ribbon conveying device between the upstream and downstream ends;
    a glass sheet conveying device comprising an upstream section located adjacent the downstream end of the glass ribbon conveying device, wherein the upstream section comprises a sheet support face and establishes a sheet travel direction, the sheet travel direction of the upstream section differing from the ribbon travel direction; and
    a transfer device positioned downstream from the downstream end of the glass ribbon conveying device and located in the upstream section of the glass sheet conveying device, the transfer device comprising a receiving surface and an actuator assembly operable to transition the receiving surface between a first vertical position and a second vertical position, wherein the first vertical position is above the sheet support face and the second vertical position is below the sheet support face.

2. The system of claim 1, wherein the first vertical position corresponds with the downstream end of the glass ribbon conveying device.

3. The system of claim 1, wherein the glass ribbon conveying device comprises a ribbon support face for conveying the glass ribbon, and further wherein the first vertical position comprises the receiving surface being horizontally aligned with the ribbon support face at the downstream end.

4. The system of claim 1, wherein the glass scoring device comprises a cutting apparatus configured to impart a score line into the glass ribbon being conveyed by the glass ribbon conveying device to form a glass sheet intermediate in the glass ribbon downstream of the score line, and further wherein the first vertical position locates the receiving surface to receive the glass sheet intermediate located downstream of the downstream end of the glass ribbon conveying device.

5. The system of claim 4, wherein a break along the score line transitions the glass sheet intermediate into a glass sheet, and further wherein moving the receiving surface from the first vertical position to the second vertical position locates the glass sheet on the sheet support face.

6. The system of claim 1, wherein the upstream end of the glass sheet conveying device comprises a plurality of rollers collectively defining the sheet support face, and further wherein the transfer device comprises a first beam defining at least a portion of the receiving surface, and even further wherein the first beam is slidably disposed between a first pair of immediately adjacent rollers of the plurality of rollers.

7. The system of claim 6, wherein the transfer device further comprises a second beam defining at least a portion of the receiving surface, and further wherein the second beam is slidably disposed between a second pair of immediately adjacent rollers of the plurality of rollers.

8. The system of claim 1, wherein the actuator assembly is further operable to transition the receiving surface between a first horizontal position and a second horizontal position in the ribbon travel direction, wherein a distance in the ribbon travel direction between an end of the receiving surface and the downstream end of the glass ribbon conveying device in the first horizontal position is less than a distance in the ribbon travel direction between the end of the receiving surface and the downstream end of the glass ribbon conveying device in the second horizontal position.

9. The system of claim 8, further comprising a controller programmed to selectively prompt the actuator assembly to move the receiving surface from the first horizontal position to the second horizontal position at a rate greater than a conveying rate of the glass ribbon conveying device.

10. The system of claim 1, wherein the ribbon travel direction is perpendicular to the sheet travel direction.

11. The system of claim 1, further comprising a lehr associated with the glass ribbon conveying device upstream of the glass scoring assembly.

12. The system of claim 1, wherein the glass scoring device comprises a cutting apparatus comprising a support shaft, a cutting member and a caster assembly connecting the cutting member and the support shaft such that the cutting member can swivel relative to the support shaft.

13. The system of claim 1, wherein the glass scoring device comprises a cutting apparatus and a force adjustment mechanism adapted to selectively alter a downward force applied onto the cutting apparatus.

14. The system of claim 1, further comprising a separation initiation device comprising a nozzle in fluid communication with a supply of pressurized gas, wherein the nozzle is associated with the glass ribbon conveying device between the downstream end and the glass scoring device.

15. The system of claim 1, wherein the receiving surface is located entirely downstream from the glass scoring device.

16. A method for processing a glass ribbon, the method comprising:
conveying a glass ribbon along a glass ribbon conveying device in a ribbon travel direction toward a downstream end of the glass ribbon conveying device, the downstream end being opposite an upstream end;
imparting a score line into the conveyed glass ribbon by a glass scoring device;
separating a glass sheet from the conveyed glass ribbon, wherein an end of the glass sheet is defined at the score line;
locating the glass sheet on a sheet support face of an upstream section of a glass sheet conveying device with a transfer device positioned downstream from the downstream end of the glass ribbon conveying device and located in the upstream section of the glass sheet conveying device;
wherein the transfer device comprises a receiving surface and an actuator assembly operable to transition the receiving surface between a first vertical position and a second vertical position, wherein the first vertical position comprises the receiving surface located above the sheet support face and the second vertical position comprises the receiving surface located below the sheet support face;
and further wherein the step of locating the glass sheet comprises transitioning the receiving surface from the first vertical position to the second vertical position; and
conveying the glass sheet along the upstream section of the glass sheet conveying device in a sheet travel direction, the sheet travel direction differing from the ribbon travel direction.

17. The method of claim 16, wherein the sheet travel direction is perpendicular to the ribbon travel direction.

18. The method of claim 16, wherein following the step of imparting a score line and prior to the step of separating a glass sheet, a glass sheet intermediate is defined in the conveyed glass ribbon, the glass sheet intermediate defined between the score line and a leading end of the conveyed glass ribbon, and further wherein prior to the step of separating, the glass sheet intermediate is connected to a remainder of the glass ribbon, and even further wherein the step of separating comprises receiving the glass sheet intermediate at the receiving surface as the glass sheet intermediate travels beyond the downstream end with continued movement of the conveyed glass ribbon.

19. The method of claim 18, wherein the step of separating the glass sheet further comprises applying a stream of pressurized gas onto the score line.

20. The method of claim 18, wherein following the step of separating the glass sheet and prior to the step of locating the glass sheet on the glass sheet support face, the method further comprising operating the transfer device to move the glass sheet in the ribbon travel direction at a rate greater than a rate of travel of the glass ribbon.

21. The method of claim 20, wherein following the step of locating the glass sheet on the sheet support face, the method further comprising raising the receiving surface from the second vertical position to the first vertical position to receive a subsequent glass sheet intermediate.

* * * * *